United States Patent
Quillien et al.

(10) Patent No.: US 12,375,319 B2
(45) Date of Patent: Jul. 29, 2025

(54) GATEWAY FOR COMMUNICATION, AN ONBOARDING DEVICE, AND METHODS THEREOF

(71) Applicant: R3 IOT Limited, Edinburgh (GB)

(72) Inventors: Kevin Alexandre Quillien, Glasgow (GB); Allan John Gavin Cannon, Glasgow (GB); Steven William Bremner, Glasgow (GB); Norman Lewis Mackenzie, Glasgow (GB); Kevin Power, Glasgow (GB)

(73) Assignee: R3 IOT Limited, Glasgow (GB)

( * ) Notice: Subject to any disclaimer, the term of this patent is extended or adjusted under 35 U.S.C. 154(b) by 713 days.

(21) Appl. No.: 17/639,887

(22) PCT Filed: Sep. 1, 2020

(86) PCT No.: PCT/GB2020/052082
§ 371 (c)(1),
(2) Date: Mar. 2, 2022

(87) PCT Pub. No.: WO2021/044128
PCT Pub. Date: Mar. 11, 2021

(65) Prior Publication Data
US 2022/0294664 A1    Sep. 15, 2022

(30) Foreign Application Priority Data

Sep. 6, 2019 (GB) .................................. 1912871
Mar. 11, 2020 (GB) .................................. 2003535

(51) Int. Cl.
*H04L 12/46* (2006.01)
*H04L 67/125* (2022.01)
(Continued)

(52) U.S. Cl.
CPC ............ *H04L 12/46* (2013.01); *H04L 67/125* (2013.01); *H04L 67/562* (2022.05); *H04L 67/563* (2022.05); *H04W 88/16* (2013.01)

(58) Field of Classification Search
CPC ..... H04L 12/46; H04L 67/125; H04L 67/562; H04L 67/563; H04L 67/59; H04L 12/66; H04W 88/16; Y04S 40/18
See application file for complete search history.

(56) References Cited

U.S. PATENT DOCUMENTS 8,456,278 B1 * 6/2013 Bergman ................ H04L 69/18
340/539.22
9,774,604 B2   9/2017 Zou et al.
(Continued)

FOREIGN PATENT DOCUMENTS

AU    2019200432 A1    6/2020
CN    105610900 A      5/2016
(Continued)

OTHER PUBLICATIONS

IoT Application Protocols Optimisation for Future Integrated M2M-Satellite Networks, 2018 Global Information Infrastructure and Networking Symposium (GIIS), Thessaloniki, Greece, 2018, pp. 1-5,) (Year: 2018).*
(Continued)

*Primary Examiner* — Ayaz R Sheikh
*Assistant Examiner* — Tarell A Hampton
(74) *Attorney, Agent, or Firm* — Bradley Arant Boult Cummings LLP

(57) ABSTRACT

A gateway (300) for communicating with end devices (302) and a remote server (316), and method thereof. The gateway (300) comprises a first server (306) comprising a first management layer (308). The first server (306) is configured to communicate with a first end device (302a), communicate
(Continued)

with the remote server (316) comprising a second management layer (320), and be selectively operable in either a first state wherein the first management layer (308) controls the first server (306), or a second state wherein the second management layer (320) controls the first server (306).

18 Claims, 17 Drawing Sheets

(51) Int. Cl.
*H04L 67/562* (2022.01)
*H04L 67/563* (2022.01)
*H04W 88/16* (2009.01)

(56) References Cited

U.S. PATENT DOCUMENTS

| | | | |
|---|---|---|---|
| 9,838,390 B2 | 12/2017 | Zakaria | |
| 10,033,807 B2* | 7/2018 | Yang | H04L 67/12 |
| 10,044,674 B2 | 8/2018 | Liu et al. | |
| 10,291,477 B1 | 5/2019 | Askar | |
| 10,425,242 B2 | 9/2019 | Berdy et al. | |
| 10,560,562 B1 | 2/2020 | Tandon | |
| 10,659,144 B1* | 5/2020 | Tofighbakhsh | H04W 24/10 |
| 10,762,183 B1* | 9/2020 | Charan | G06F 21/40 |
| 10,812,600 B1* | 10/2020 | Naaman | H04L 67/142 |
| 11,121,925 B2 | 9/2021 | Lee et al. | |
| 2008/0056261 A1* | 3/2008 | Osborn | H04L 69/08 |
| | | | 370/392 |
| 2008/0126111 A1 | 5/2008 | Loda | |
| 2013/0041997 A1* | 2/2013 | Li | H04W 4/70 |
| | | | 709/223 |
| 2013/0073746 A1* | 3/2013 | Singh | H04W 56/00 |
| | | | 709/248 |
| 2014/0089666 A1* | 3/2014 | Kim | H04W 12/02 |
| | | | 713/170 |
| 2014/0129672 A1* | 5/2014 | Singh | H04L 43/08 |
| | | | 709/217 |
| 2015/0055469 A1* | 2/2015 | Lee | H04L 47/127 |
| | | | 370/235 |
| 2015/0118996 A1* | 4/2015 | Shaw | H04W 12/08 |
| | | | 455/411 |
| 2015/0229605 A1* | 8/2015 | Wu | H04L 67/10 |
| | | | 726/12 |
| 2015/0256544 A1* | 9/2015 | Wu | H04L 61/5007 |
| | | | 726/12 |
| 2015/0304129 A1* | 10/2015 | Yang | H04L 12/66 |
| | | | 370/254 |
| 2015/0308805 A1 | 10/2015 | Van Vliet et al. | |
| 2016/0057807 A1* | 2/2016 | Tirronen | H04W 52/0251 |
| | | | 370/311 |
| 2016/0212099 A1* | 7/2016 | Zou | H04L 63/1408 |
| 2016/0381030 A1* | 12/2016 | Chillappa | H04W 4/38 |
| | | | 726/11 |
| 2017/0094033 A1* | 3/2017 | Sathyadevan | H04L 67/12 |
| 2017/0155703 A1* | 6/2017 | Hao | H04W 4/70 |
| 2017/0169264 A1 | 6/2017 | Britt et al. | |
| 2017/0195424 A1 | 7/2017 | Nasir et al. | |
| 2017/0346953 A1* | 11/2017 | Abassi | H04M 11/007 |
| 2017/0353556 A1 | 12/2017 | Seenappa et al. | |
| 2018/0004176 A1* | 1/2018 | Tsubota | H04L 12/2818 |
| 2018/0054327 A1* | 2/2018 | Ameling | H04L 12/66 |
| 2018/0062873 A1 | 3/2018 | Chiang et al. | |
| 2018/0077012 A1 | 3/2018 | Tellado et al. | |
| 2018/0281598 A1* | 10/2018 | Shu | G05B 19/042 |
| 2018/0316603 A1* | 11/2018 | Boucadair | H04L 67/141 |
| 2018/0359641 A1 | 12/2018 | Idnani et al. | |
| 2019/0019402 A1 | 1/2019 | Nachshon et al. | |
| 2019/0020718 A1* | 1/2019 | Mathews | H04L 67/55 |
| 2019/0026458 A1* | 1/2019 | Choules | H04L 9/3268 |
| 2019/0028561 A1* | 1/2019 | Freedman | H04L 43/0876 |
| 2019/0058586 A1 | 2/2019 | Kumar et al. | |
| 2019/0068592 A1 | 2/2019 | Mattela et al. | |
| 2019/0075080 A1 | 3/2019 | Entezari et al. | |
| 2019/0150074 A1* | 5/2019 | Narayanan | H04L 69/18 |
| | | | 455/434 |
| 2019/0173971 A1* | 6/2019 | Na | H04W 4/70 |
| 2019/0200168 A1 | 6/2019 | Stapleford et al. | |
| 2019/0239068 A1 | 8/2019 | Mudulodu et al. | |
| 2019/0357023 A1 | 11/2019 | Park | |
| 2020/0145213 A1* | 5/2020 | Mohan | H04L 63/102 |
| 2020/0304563 A1 | 9/2020 | Cheng et al. | |
| 2020/0314356 A1* | 10/2020 | Storer | G06T 7/194 |
| 2020/0344847 A1 | 10/2020 | Nardini et al. | |

FOREIGN PATENT DOCUMENTS

| | | |
|---|---|---|
| CN | 106533539 A | 3/2017 |
| CN | 107947828 A | 4/2018 |
| CN | 108011660 A | 5/2018 |
| CN | 108322506 A | 7/2018 |
| CN | 108848025 A | 11/2018 |
| CN | 110248364 A | 9/2019 |
| CN | 106790569 B | 12/2019 |
| EP | 3208950 A1 | 8/2017 |
| EP | 3219046 A1 | 9/2017 |
| HK | 1247744 A1 | 9/2018 |
| JP | 2017102627 A | 6/2017 |
| JP | 2019537330 A | 12/2019 |
| KR | 101869519 B1 | 7/2018 |
| KR | 101926276 B1 | 12/2018 |
| KR | 1020190001138 A | 1/2019 |
| KR | 20190046168 A | 5/2019 |
| KR | 20190067603 A | 6/2019 |
| KR | 1020190095593 A | 8/2019 |
| KR | 101991511 B1 | 9/2019 |
| KR | 1020190134922 A | 12/2019 |
| WO | WO-2014193235 A1 | 12/2014 |
| WO | WO-2016076641 A1 | 5/2016 |
| WO | WO-2016161027 A1 | 10/2016 |
| WO | WO-2018071311 A1 | 4/2018 |
| WO | WO-2018071312 A1 | 4/2018 |
| WO | WO-2018158607 A1 | 9/2018 |
| WO | WO-2018232111 A1 | 12/2018 |
| WO | WO-2019089164 A1 | 5/2019 |
| WO | WO-2020258460 A1 | 12/2020 |

OTHER PUBLICATIONS

Lysogor Ivan 1 et al: "Survey of data exchange formats for hetrogeneous LPWAN-satellite IoT networks", 2018 Moscow Workshop On Electronic and Networking Technologies (MWENT), IEEE, Mar. 14, 2018, pp. 1-5.
Huber, Oliver; International Search Report; PCT/GB2020/052082; dated Dec. 14, 2020; 4 pages.
Huber, Oliver; International Preliminary Report On Patentability and Demand for PCT Chapter II; PCT/GB2020/052082; dated Jul. 28, 2021; 19 pages.
Huber, Oliver; Written Opinion, PCT/GB2020/052082, dated Dec. 14, 2020; 8 pages.
Private Network without internet, Gateways/Raspberry Pi Gateway—The Things Network, 2018; webpage accessed Jan. 4, 2019 at https://www.thethingsnetwork.org/forum/t/private-network-without-internet/13365.
Shahzad, Farrukh; "Satellite Monitoring of Wireless Sensor Networks (WSNs)"; Procedia Computer Science 21 (2013); pp. 479-484.
Lorawan Network Server, Network Server—The Things Industries; webpage accessed Jan. 4, 2019 at https://www.thethingsindustries.com/technology/network-server.
"LoRa with Satellite Backhaul Communication", Gateways—The Things Network, 2017; webpage accessed Jan. 4, 2019 at https://www.thethingsnetwork.org/forum/t/lora-with-satellite-backhaul-communication/9822.
"Raspberry Pi Install", Raspberry Pi—LoRa Server, open-source LoRaWAN network-server; webpage accessed Jan. 4, 2019 at https://www.loraserver.io/guides/raspberry-pi/.

(56) References Cited

OTHER PUBLICATIONS

Zhang, Yi, "TCP/IP Over Satellite", 2020, online PDF document accessed May 3, 2022 at https://fdocuments.in/document/tcpip-over-satellite-yi-zhang-g27525863-csci-ip-over-satellite-yi-zhangpdf.html?page=1; 8 pages.
"Lora—Is LoRaWan only accessible with an internet connection?", Stack Overflow, 2018, webpage accessed Jan. 4, 2019 at https://stackoverflow.com/questions/49355580/is-lorawan-only-accessible-with-an-internet-connection.
"Does the IoT really need the Internet?", Farnell element14, 2018; webpage accessed Jan. 4, 2019 at https://uk.farnell.com/does-the-iot-really-need-the-internet.
"Satellite communications and space exploration", Fleet Space Technologies—Portal; web page accessed Feb. 23, 2022 at https://fleetspace.com/portal.
Ishac, J. et al., "On the performance of TCP spoofing in satellite networks"; IEEE Conference Publication | IEEE Xplore, Oct. 2001, web page accessed Feb. 23, 2022 at https://ieeexplore.ieee.org/abstract/document/985925?anchor=citations&signout=success.
"Satellite Internet access", Wikipedia, webpage accessed Jan. 4, 2019 at https://en.wikipedia.org/wiki/Satellite_Internet_access.
Šljivo, Amina et al., "Performance Evaluation of IEEE 802.11ah Networks with High-Throughput Bidirectional Traffic", Sensors 2018, 18, 325; Jan. 23, 2018, 28 pages, https://doi.org/10.3390/s18020325.
Yang, Xueying, "LoRaWAN: Vulnerability Analysis and Practical Exploitation", Jul. 21, 2017, Thesis, Delft University of Technology, 87 pages.
Satellite Internet Protocols—TCP/IP over satellite—VSAT Systems Broadband Satellite Internet Protocols, 2009-2018, webpage accessed on 4 Jan. 4, 2019 at http://www.vsat-systems.com/Education/Satellite-Internet-Explained/Performance/Protocols-and-applications/.
"Satellite Internet FAQs About Latency and Spoofing", webpage accessed Jan. 4, 2019 at http://www.wafa.ae/en/vsat/faq/Satellite-Internet-faqs-Spoofing-Latency.aspx.
"Australian start-up Fleet Space aims to enable IoT globally", Computerworld, Apr. 19, 2018, webpage accessed Aug. 7, 2019 at https://www.computerworld.com.au/article/640315/australian-start-up-fleet-space-aims-enable-iot-globally/.
"AWS IoT Greengrass", Amazon Web Services, webpage accessed Aug. 8, 2019 at https://aws.amazon.com/greengrass/.
"Fleet Space Portal on Behance", webpage accessed May 8, 2019 at https://www.behance.net/gallery/66120863/Fleet-Space-Portal.
"Fleet Space Technologies unveils launch partners for first nanosatellite launches", Press Release, Jun. 19, 2018, webpage accessed May 3, 2022 at https://lora-alliance.org/wp-content/uploads/2018/06/Fleet-Space-Technologies-unveils-launch-partners-for-first-nanosatellite-launches-Google-Docs.pdf.
"How AWS IoT Greengrass Brings Cloud Capabilities to the Edge", The New Stack, May 17, 2019, webpage accessed Sep. 8, 2019 at https://thenewstack.io/how-aws-iot-greengrass-brings-cloud-capabilities-to-the-edge/.
"Tailings dam Monitoring", Mining—Inmarsat, webpage accessed Jul. 25, 2019 at https://www.inmarsat.com/enterprise/mining/?proposition=Tailings+dam+monitoring.
"Satcom-IoT via LoRa-WAN", Addvalue Technologies, webapge accessed Jul. 24, 2019 at https://www.addvaluetech.com/satcom-iot-via-lora-wan/.
Screen, Mandy, UKIPO Search Report, Application No. GB1912871.9, dated May 13, 2020, 4 pages.
Screen, Mandy, UKIPO Search report, Application No. GB2003535.8, Aug. 28, 2020, 3 pages.
Lee, B M et al., "An Easy Network Onboarding Scheme for Internet of Things Networks", IEEE Access 7 (Dec. 28, 2018), 10 pages, Digital Object Identifier 10.1109/ACCESS.2018.2890072.
"Device Registration | The Things Network", webpage accessed on Feb. 23, 2022 at https://www.thethingsnetwork.org/docs/devices/registration/.
Foubert, Brandon et al. "Long-range wireless radio technologies: A survey", Future Internet 12.1 (2020): 13, www.mdpi.com/journal/futureinternet <http://www.mdpi.com/journal/futureinternet>, DOI: 10.3390/fi12010013.
"Internet of things", Wikipedia, webpage accessed Jan. 17, 2020 at https://en.wikipedia.org/wiki/Internet_of_things.
"Secure and zero-touch IoT device onboarding at scale with Intel SDO", webpage accessed Jan. 15, 2020 at https://www.i-scoop.eu/iot-intel-sdo-secure-device-onboarding/.
"What is LoRaWAN—A technical overview of LoRa and LoRaWAN", LoRa Alliance—Technical Marketing Workgroup 1.0, Nov. 2015, 20 pages.
Blyler, John, "Zero Touch IoT Security Is Key to Continued Growth", Jan. 4, 2018, webpage accessed Mar. 17, 2020 at https://www.insight.tech/content/8220-zero-touch-8221-iot-security-is-key-to-continued-growth.
"Global connectivity for the IoT—Flavia Nardini (FLEET Space)—The Things Conference 2019", https://www.youtube.com/watch?v=csRe0WzvtD8.
"Fleet Portal Setup Tutorial on Vinmeo", https://vimeo.com/282592285.

* cited by examiner

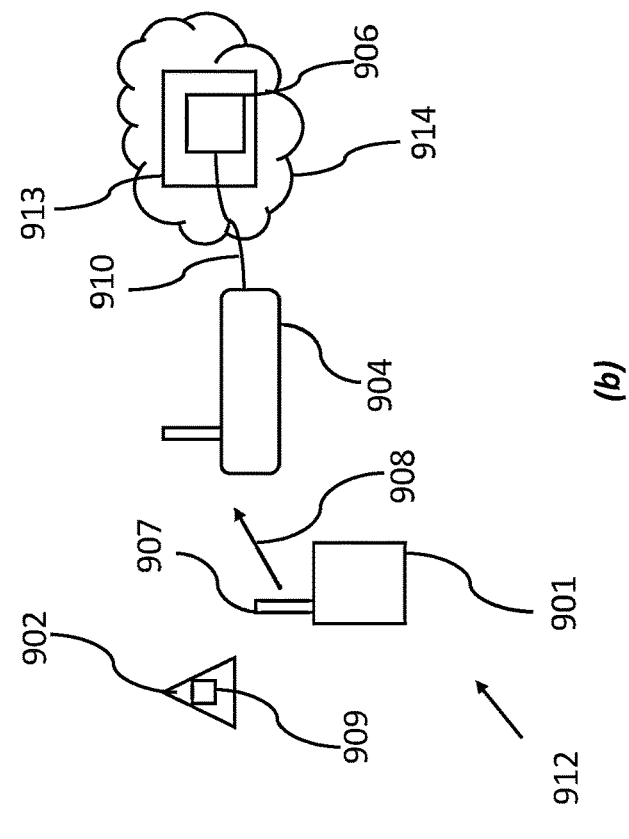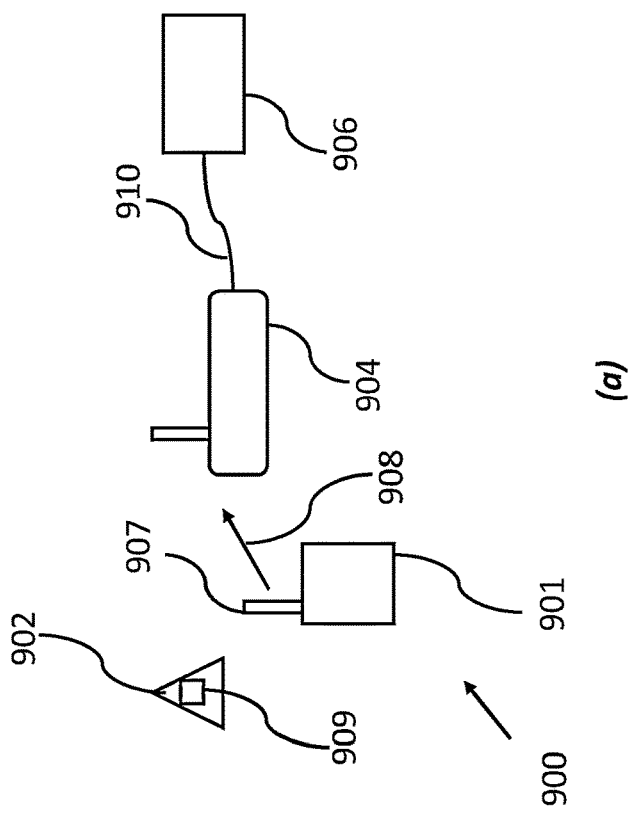
*Figure 9*

GATEWAY FOR COMMUNICATION, AN ONBOARDING DEVICE, AND METHODS THEREOF

The present disclosure relates to a gateway. In particular the present disclosure relates to a gateway for communication with end devices and a remote server.

The present disclosure relates to an onboarding device. In particular, the present disclosure relates to an onboarding device for registering one or more end devices to an internet of things network and/or for removing one or more end devices from an internet of things network.

BACKGROUND

The Internet of Things (IoT) refers to connected IoT devices or "things" such as sensors that measure properties of their surroundings. IoT sensors can be used to gather data which can then be analysed to extract useful information that in turn can enable optimisation and can provide meaningful insights to businesses. An IoT device is a type of end device.

FIG. 1(a) is a schematic of a typical IoT network 100. The IoT network 100 comprises IoT devices 102, a gateway 104, an internet, or cloud, service 106 and an end user 108. The IoT devices 102 comprise sensors that can measure a property of the environment, for example, temperature, humidity or ambient light conditions. After one of the IoT devices 102 measures a property using one of its sensors, it transmits the associated data to the gateway 104 via a wireless connection 110. The gateway 104 then transmits the data to the cloud service 106, which is accessible by the end user 108. The gateway 104 is connected to the cloud service 106 via a connection 112 and the cloud service 106 is connected to the end user 108 via a connection 114. The connections 112, 114 may be wireless (for example using mobile/cellular connectivity) or wired. The connection 112 may be referred to as the "backhaul".

The wireless connection 110 may use one of a variety of communication protocols. One such communication protocol is a low power wide area network (LPWAN) communication protocol, such as LoRaWAN. Current practise for deploying a LoRaWAN or other LPWAN IoT networks for the provision of IoT communication involves setting up a commercial gateway, such as the gateway 104 as shown in FIG. 1(a).

To function, the gateway 104 requires both power and data communication infrastructure which will be dependent on the infrastructure available locally where the gateway 104 is deployed. The data communication infrastructure will usually be wired internet, 3G or 4G.

The gateway 104 acts as a data packet forwarder in both directions (from the IoT devices 102 to the cloud service 106, and from the cloud service 106 to the IoT devices 102) with no additional processing or intelligence managing or influencing the data packet forwarding operation. Additionally, the gateway 104 can provide basic telemetry information on how the gateway 104 is performing. The gateway 104 functions in a similar way to a modem/router provided by internet service providers (ISPs) for internet connectivity at home which just forward internet traffic back and forth. Traditional telecoms providers are deploying local network meshes, typically in towns in cities, and customers requiring IoT connectivity can pay to use the ground-based network. To connect an end-device requires registering it on a cloud server that is part of the cloud service 106.

To work, IoT depends on communication: the ability to move data from the IoT devices 102 to where it is needed (typically online/on the cloud, as illustrated by the cloud service 106). There is however currently a shortfall in suitable communications infrastructure (wired or mobile/cellular connectivity) in over 90% of the world. As such, there are many locations in the world where the IoT network 100 is unsuitable, because the connection 112 or power requirements cannot be provided by the existing infrastructure, or the existing infrastructure is otherwise unsuitable for purpose.

FIG. 1(b) is a schematic of an IoT network 116 where the connection 112 is intermittent or broken. The IoT network 116 shares features with the IoT network 100 and therefore common features are represented by common reference numerals and variables.

Each of the IoT devices 102 sends data related to its measurement at various time intervals. For communication by LoRaWAN, the sending of data may be provided by packing the data and transmitting it at three slightly different frequencies, one or all of which may be suitable for receiving by the gateway 104. If the gateway 104 is sufficiently close to the IoT devices 102, it can receive their signals and forward the data on to the cloud service 106 via the connection 112. However, in this case the gateway 104 requires an "always-on" connection to the cloud service 106 to function.

By "always-on" it is meant that during operation the gateway 104 is connected to the cloud service 106 in such a way that data can be transmitted to/from the gateway 104 from/to a server on the cloud service 106. If the connection 112 is not present, even for a short period, and data cannot be transmitted between the gateway 104 and the server on the cloud service 106, then the gateway 104 will not function correctly. In summary, if the connection 112 is intermittent or broken the gateway 104 will function in an unpredictable way and the data from the IoT devices 102 will not be transmitted to the server on the cloud service 106.

"Always-on" is a requirement for LPWAN. LPWAN uses centralised networks and protocols where communication with nodes needs to be constant for purposes that include, but is not limited to, routing and authentication. Many commercial LPWANs designed to be rolled out into large centralised networks including LoRaWAN, SIGFOX and NB-IoT have an "always-on" requirement.

FIG. 1(c) is a schematic of a satellite communication network 118, as can be used to provide pipes of communication in areas of the world without traditional communication. The communication network 118 is an example of a very small aperture terminal (VSAT) network. Common features between Figures are represented by common reference numerals and variables. The gateway 104 transmits data to the cloud service 106 via a satellite 119.

To overcome the issues of poor communications infrastructure, as may be present in remote locations, a solution can be the use of satellite communications. However, as an "always-on" connection is required between the gateway 104 and the cloud service 106 for LPWAN, a typical IoT network, such as that depicted in FIG. 1(a) is unsuitable for use in satellite communication when there is an intermittent, flawed or otherwise unreliable connection between the gateway 104 and the satellite 119.

The always-on connection is not present because the satellite 119 is not always available or the connection with the satellite 119 is not always usable. For example, during operation the satellite 119 may be positioned relative to the gateway 104 such that it cannot receive a signal from the gateway 104 for a period of time. Other issues with such networks include low latency, limited bandwidth, usage cost limitations and they may not be IP compatible.

Known systems that use IoT devices with satellite communications use dedicated satellite constellations to answer the need for remote IoT communications. FIG. 1(d) is a schematic of an IoT network 120 using a dedicated satellite constellation. A satellite constellation may be defined as a group of satellites. In FIG. 1(d) a single satellite (labelled by reference numeral 122) is shown. Common features between Figures are represented by common reference numerals and variables.

By "dedicated satellite constellation" it is meant that the satellite constellation has been designed specifically to function with the IoT devices 102.

In operation the IoT devices 102 transmit data directly to the satellite 122, when the satellite 122 is above a given IoT device. The satellite 122 is above the IoT devices 102 at a first position 122a. Due to the technical and licensing issues, these architectures are limited to one-way communication (device to user only) and uses a "store-and-forward" concept where the satellite 122 physically carries the data from when it was uploaded when the satellite 122 was above the device at the first position 122a to where is can be downloaded to an Earth station onto the cloud 106 at a second position 122b. No gateway is used in the IoT network 120 of FIG. 1(d).

The IoT network 120 uses a dedicated satellite constellation and typically only allows one-way communication from the IoT devices 102 to the cloud service 106. One-way communication is typically used due to physical constraints and licensing limitations. Regarding the licensing limitations, frequencies that can be transmitted on the ground are usually different to those that can be used to transmit from space. Since a lot of IoT devices typically receive and transmit at the same frequency range for simplicity, this means most satellite constellations are built for one-way communications.

Other known LPWAN gateways include an option of running a network server on-board. The network server provides the functionality of the server on the cloud service 106 as described previously. The inclusion of the server in the gateway means that the "always-on" requirement is met, even when disconnected from the cloud service 106. This enables the creation of an isolated IoT deployment that still functions like the IoT network 100 in FIG. 1(a) by forwarding data packets back and forth between the IoT devices 102 and the end user 108.

FIG. 2 is an alternative schematic of an IoT network of the type shown in FIG. 1(a). Common features are represented by common reference numerals and variables. The cloud service 106 comprises a server 200 that is used to communicate with a first gateway 104a and a second gateway 104b. The server 200 may be referred to as a network server. Each of the gateways 104a, 104b communicates with IoT devices, the IoT devices 102a, 102b being configured to communicate with the gateway 104a and the IoT devices 102c, 102d being configured to communicate with the gateway 104b.

An important function for the operation of an internet of things (IoT) network is the ability to onboard end devices. An end device may be a sensor or an actuator that connects to the IoT network in order to communicate (sending sensor data, accepting commands, etc.).

Onboarding an end device "tells" the IoT network to accept the connection from the onboarded device. This is important to ensure only the desired end devices are allowed to connect to the IoT network. Furthermore, onboarding enables the sharing the information necessary to provide data security such as encryption.

Onboarding (also called registration) for wireless low power wide area network (LPWAN) architectures requires the sharing of information pertaining to the end device with the element in control of the network. In the case of LoRaWAN for example, the network server, which is typically located on the cloud, is the authority that accepts or rejects data from end devices. Onboarding therefore requires "telling" the network server to accept the data from the end device in question, and may also include the forwarding of a key to applications to enable end-to-end encryption of the data transmitted to and from the end device across the IoT network.

FIG. 8 is a schematic of an IoT network 800 as is known in the prior art. The IoT network shares features with the IoT network 100 of FIG. 1(a) and common features are represented by common reference numerals and variables.

Onboarding of an end device (for example one the IoT devices 102 as shown in FIG. 8) is a manual process, that requires a computer 802 connected to the internet and privileged access to a user account on a network server 804 which may be part of the of the cloud service 106. In the present example, the computer 802 connects with the network server 804 via a wired connection 806 to the gateway 104.

An end device for use in an IoT network using LoRaWAN typically ships with a pre-programmed identifier, called a "devEUI", that will usually be marked on the labelling of the end device. In the present example, the devEUI of one of the IoT devices 102 must be shared with the network server 804 to ensure that data from that particular IoT device 102 is accepted by the IoT network 800.

For a regular IoT network deployment using LoRaWAN, a gateway is a simple packet forwarder, and the network server is typically located online on the cloud.

The onboarding process is normally carried out in an office by a person who is responsible for the network server 804 and who will have access to all the end devices to be onboarded, prior to the end devices being shipped out for deployment in the field. For a large, commercial deployment this is a serious limitation and bottleneck. An IoT network using LoRaWAN can enable up to a thousand end devices to be connected to a single gateway. Therefore, for a multi-gateway deployment there can be a substantial number of end devices that need to be added, removed and/or replaced as part of the operation of the IoT network 800.

SUMMARY

It is desirable to provide a gateway for communication with end devices and a satellite that can be applied in locations with an unfavourable communications infrastructure by overcoming the issues associated with the "always-on" requirement of LPWAN.

Furthermore, it is desirable to provide a gateway for communication with end devices and existing satellite services, without having to rely on providing a dedicated satellite constellation.

Furthermore it is desirable to provide a gateway for communication with end devices and a satellite that can provide two way communication between end devices and an end-point, such as a cloud server, or an internet service, that is accessible by an end user.

Furthermore it is desirable to provide a gateway for communication with end devices that can be controlled remotely and function alongside other gateways as part of a multi-gateway distribution.

It is desirable to provide a method of onboarding IoT end devices that overcomes or mitigates one or more of the afore-mentioned problems.

According to a first aspect of the disclosure there is provided a gateway for communicating with end devices and a remote server, comprising a first server comprising a first management layer, the first server being configured to i) communicate with a first end device, ii) communicate with the remote server comprising a second management layer, and iii) be selectively operable in either a first state wherein the first management layer controls the first server, or a second state wherein the second management layer controls the first server.

Optionally, the first end device is a first IoT device.

Optionally, a communication link between the first server and the remote server is intermittent.

Optionally, the first server is configured to communicate with the remote server via one or more satellites.

Optionally, the, or each, satellite is a geostationary satellite or a low Earth orbit satellite Optionally, the first server is configured to transmit data received from the first end device to the remote server and/or the first server is configured to receive data transmitted from the remote server.

Optionally, the first management layer is configured to enable onboarding of end devices.

Optionally, the first end device and the first server communicate using one of i) a low power wide area network (LPWAN) communication protocol, ii) a wired connection, and iii) 4G, 5G or further generations of mobile network technology.

Optionally, the LPWAN communication protocol is LoRaWAN.

Optionally, the first server is configured to spoof the LPWAN backend.

Optionally, the second management layer is configured to enable onboarding of end devices.

Optionally, the gateway is configured to enter into a power conservation state for at least a portion of a time period.

Optionally, the gateway is configured to enter the power conservation state for at least a portion of the time period when the first end device and/or the remote server are not communicating with the gateway.

Optionally, the power conservation state comprises turning off one or more sub-components of the gateway or having one or more sub-components of the gateway enter a low power state.

Optionally, the first server is configured to buffer data prior to communication to the remote server.

Optionally, the buffered data is at least one of data received from the first end device, and management data generated by the gateway.

Optionally, the buffered data is ranked based on importance.

Optionally, the first server comprises a memory element configured to store data.

Optionally, the gateway is configured to be powered by at least one of a renewable energy source, mains power, or a battery.

Optionally, the gateway comprises an edge computing device configured to decrypt and/or analyse data received from the first end device prior to transmission to the remote server.

Optionally, the first server is configured to communicate with one or more additional end devices.

Optionally, the remote server is located on a cloud service.

Optionally, the gateway comprises at least one radio for communication with the first end device and/or the satellite.

Optionally, the first server is a network server. Optionally, the remote server is a network server. Optionally the first server and the remote server are network servers.

According to a second aspect of the disclosure there is provided a communication network comprising one or more gateways of the first aspect.

Optionally, the communication network comprises for the, or each, gateway at least one end device and the remote server.

According to a third aspect of the disclosure there is provided a method of communicating with a first end device and a remote server using a gateway comprising a first server comprising a first management layer, the method comprising i) communicating with the first end device using the first server, ii) communicating with the remote server comprising a second management layer using the first server, and iii) selectively operating in either a first state wherein the first management layer controls the first server, or a second state wherein the second management layer controls the first server.

It will be appreciated that the method of the third aspect may include features set out in the first and second aspects and can incorporate other features as described herein.

According to a fourth aspect of the disclosure there is provided an onboarding device for registering one or more end devices to an internet of things network and/or for removing one or more end devices from an internet of things network, wherein the internet of things network comprises a gateway and a registration server, the onboarding device comprising a transmitter configured to transmit a command signal to the gateway using a long range wireless communication protocol, the command signal being dependent on an identifier associated with an end device, wherein the gateway is configured to receive the command signal and to provide the command signal to the registration server, and based on the received command signal, the registration server is configured to i) register the end device to the internet of things network, or ii) remove the end device from the internet of things network.

Optionally, the long range wireless communication protocol is a low power wide area network (LPWAN) communication protocol.

Optionally, the LPWAN communication protocol is LoRaWAN.

Optionally, the transmitter comprises a LoRa radio.

Optionally, the onboarding device comprises an electronic reader configured to read the identifier associated with the end device.

Optionally, the electronic reader is configured to read at least one of a barcode, a near field communication (NFC) tag and a radio-frequency identification (RFID) tag.

Optionally, the barcode is a QR code.

Optionally, the onboarding device comprises an input device configured to provide a user with an interface to enable a user to i) manually input the identifier associated with the end device to be registered or removed, and/or ii) select the identifier associated with the end device to be registered or removed from a list of stored identifiers, each identifier stored in the list being associated with a different end device.

Optionally, the onboarding device comprises a memory element for storing the list of stored identifiers.

Optionally, the onboarding device comprises a communication interface configured to enable the onboarding device to communicate with an electronic device, wherein the electronic device is configured to enable a user to control the onboarding device.

Optionally, the communication interface is configured to enable wired and/or wireless communication between the onboarding device and the electronic device.

Optionally, the electronic device comprises an electronic reader configured to read the identifier associated with the end device.

Optionally, the electronic reader is configured to read at least one of a barcode, a near field communication (NFC) tag and a radio-frequency identification (RFID) tag.

Optionally, the barcode is a QR code.

Optionally, the electronic device comprises an input device configured to provide a user with an interface to enable a user to i) manually input the identifier associated with the end device to be registered or removed, and/or ii) select the identifier associated with the end device to be registered or removed from a list of stored identifiers, each identifier stored in the list being associated with a different end device.

Optionally, the electronic device comprises a memory element for storing the list of stored identifiers.

Optionally, the electronic device is one of i) a mobile phone, ii) a tablet, and iii) a computer.

Optionally, the gateway is configured to communicate with the, or each, end device using the long range wireless communication protocol.

Optionally, the registration server is configured to onboard the end device to the internet of things network based on the received registration signal and a confirmation signal received as part of a multi-factor authentication process.

Optionally, the end device comprises at least one of a sensor and an actuator.

Optionally, the gateway comprises the registration server.

Optionally, the gateway is configured to communicate with the, or each, end device and a remote server, the gateway comprising a first server comprising a first management layer, the first server being configured to i) communicate with a first end device, ii) communicate with the remote server comprising a second management layer, and iii) be selectively operable in either a first state wherein the first management layer controls the first server, or a second state wherein the second management layer controls the first server.

Optionally, the first server or the remote server comprises the registration server.

It will be appreciated that the onboarding device of the fourth aspect can incorporate other features as described herein. It will be appreciated that the gateway of the fourth aspect may include features set out in the first aspect and can incorporate other features as described herein.

According to a fifth aspect of the present disclosure there is provided an internet of things network comprising the onboarding device, the gateway and the registration server of the fourth aspect.

It will be appreciated that the internet of things network of the fifth aspect can incorporate other features as described herein. It will be appreciated that the gateway of the fifth aspect may include features set out in the first aspect and can incorporate other features as described herein.

According to a sixth aspect of the present disclosure there is provided a method of registering and/or removing one or more end devices from an internet of things network using an onboarding device comprising a transmitter, the method comprising transmitting a command signal from the transmitter to a gateway using a long range wireless communication protocol, the command signal being dependent on an identifier associated with an end device, receiving the command signal at the gateway, providing the command signal to the registration server, and based on the command signal either, i) registering the end device to the internet of things network using the registration server, or ii) removing the end device from the internet of things network using the registration server.

It will be appreciated that the method of the sixth aspect may include features set out in the fourth and fifth aspects and can incorporate other features as described herein.

BRIEF DESCRIPTION OF THE DRAWINGS

The disclosure is described in further detail below by way of example and with reference to the accompanying drawings in which:

FIG. 9(a) is a schematic of an IoT network comprising an onboarding device in accordance with a fourth embodiment of the present disclosure and FIG. 9(b) is a schematic of an IoT network comprising the onboarding device in accordance with a fifth embodiment of the present disclosure;

DETAILED DESCRIPTION

Figure 3A:
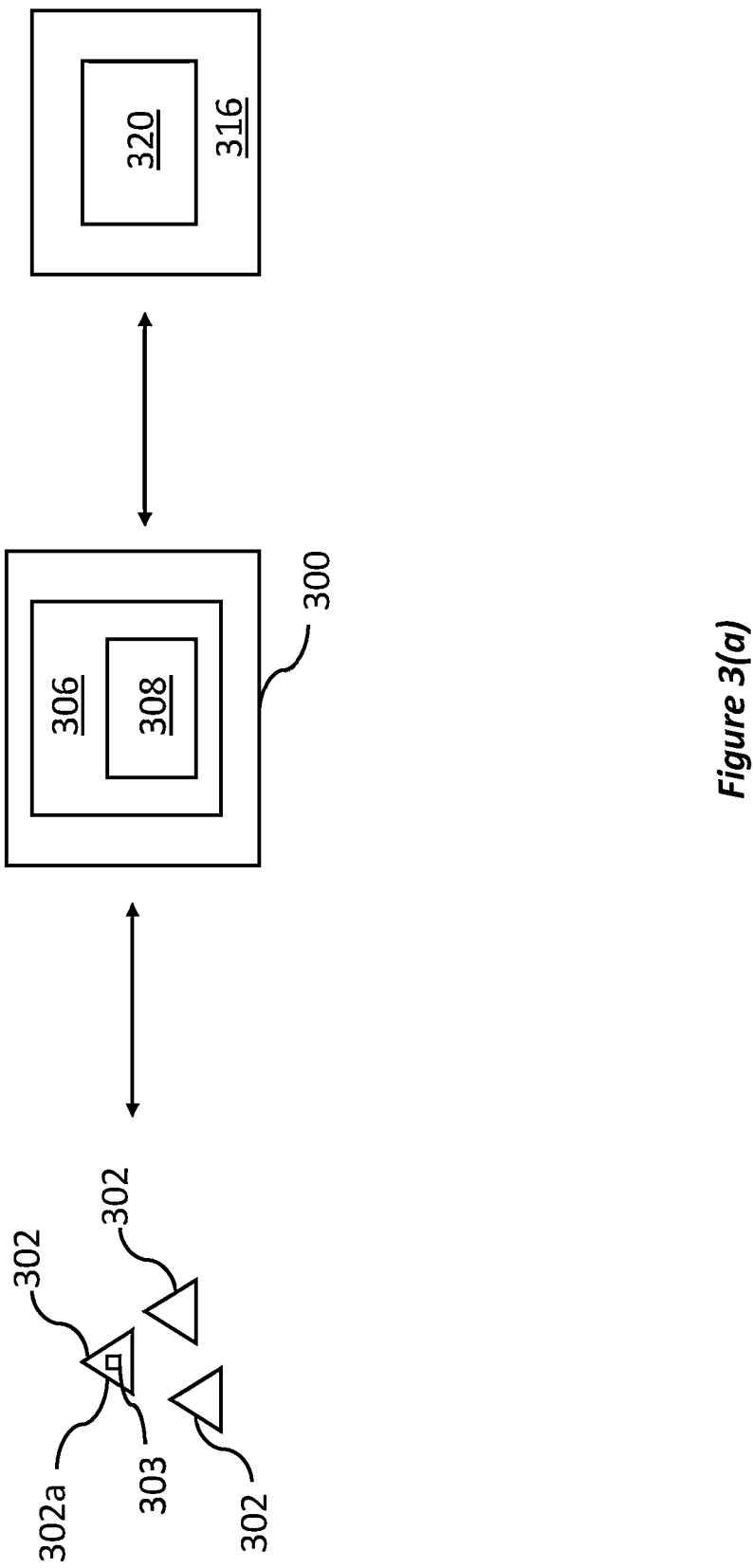
FIG. 3(a) is a schematic of a gateway for communicating with end devices and a remote server in accordance with a first embodiment of the present disclosure and FIG. 3(b) is a schematic of a specific embodiment of the gateway of FIG. 3(a)

FIG. 3(a) is a schematic of a gateway 300 for communicating with end devices 302 and a remote server 316 in accordance with a first embodiment of the present disclosure. The gateway 300 comprises a first server 306 comprising a first management layer 308.

The first server 306 is configured to communicate with at least one of the end devices 302 (for example, an end device 302a). The first server 306 is also configured to communicate with the remote server 316. The remote server 316 comprises a second management layer 320.

By "remote server" it is meant that the remote server 316 is not part of the physical local area network (LAN) of the gateway 300. The remote server 316 may be located a substantial distance from the gateway 300. For example, in one embodiment this may be a few hundred metres, whereas further embodiments may have the remote server 316 located on a different country or continent to the gateway 300. Additionally, it will be appreciated that the remote server 316 may be located physically near the gateway 300 whilst still not being part of its LAN.

The first server 306 is configured to be selectively operable in either a first state in which the first management layer 308 controls the first server 306, or a second state in which the second management layer 320 controls the first server 306.

In the present embodiment, one or more of the end devices 302 is an IoT device comprising a sensor that enables the end device 302 to measure a property of its surroundings. As discussed previously, the property that can be measured may include, but is not limited to, temperature, humidity or ambient light conditions. It will be appreciated that in further embodiments, one or more of the end devices 302 may comprise one or more sensors. To aid in the clarity of the drawings, only a single sensor 303 has been illustrated and labelled for one of the end devices 302.

In further embodiments one or more of the end devices 302 may be an IoT device comprising one or more other electrical devices, as an alternative to, or in addition to the sensors. These electrical devices may include actuators, user displays or lights, such as LEDs, that enables the end device 302 comprising the electrical device to interact with its local environment based on a signal received from the gateway 300. The end devices 302 may be configured to provide one-way, or two-way communication.

It will be appreciated that in further embodiments, one of the end devices 302, some of the end devices 302 or all of the end devices 302 may be IoT devices.

In a further embodiment, the first server 306 is configured to transmit data received from one or more of the end devices 302 (for example the end device 302a) to the remote server 316. In a further embodiment the first server 306 is configured to receive data transmitted from the remote server 316.

Figure 3B:
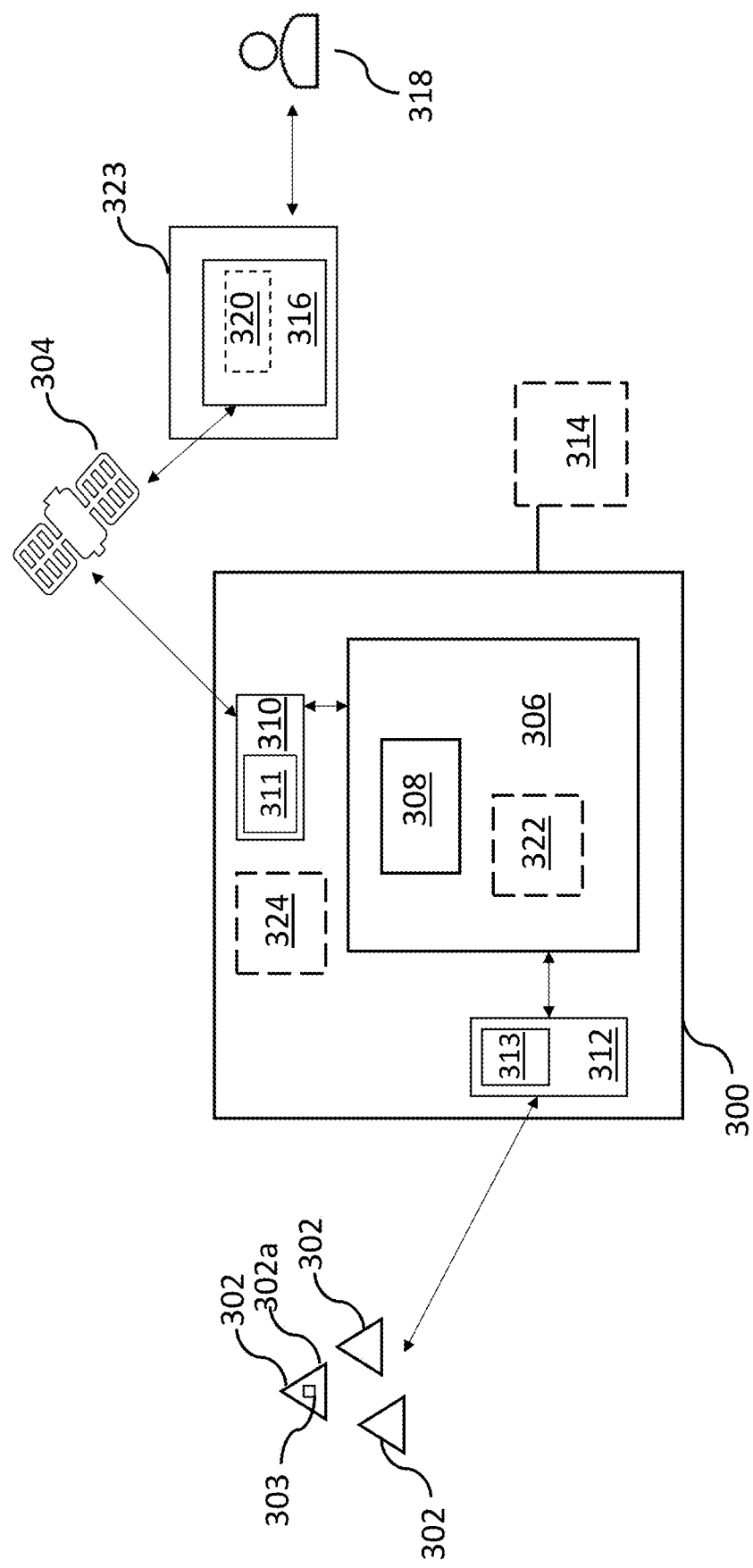

FIG. 3(b) is a schematic of a specific embodiment of the gateway 300 as shown in FIG. 3(b) used within a communication network comprising a satellite 304. Common features between Figures are represented by common reference numerals and variables.

In the present embodiment the first server 306 is configured to communicate with the remote server 316 via the satellite 304. In further embodiments the first server 306 may be configured to communicate with the remote server 316 via multiple satellites. In such an embodiment, the satellite used for communication between the first server 306 and the remote server 316 may be selected based on criteria such as the signal strength of a communication link between the first server 306 and the satellite or the availability of the satellite. Furthermore, multiple satellite communication links may be used simultaneously.

The satellite 304 may be a geostationary (GEO) satellite or a low Earth orbit (LEO) satellite. In further embodiments, where the first server 306 is configured to communicate with the remote server 316 via multiple satellites, the multiple satellites may all be GEO satellites or LEO satellites, or a combination of the two.

In the present embodiment the gateway 300 comprises a radio 310 comprising an antenna 311 for transmitting data to the satellite 304 and for receiving data transmitted from the satellite 304. The gateway 300 further comprises a radio 312 comprising an antenna 313 for transmitting data to the end devices 302 and for receiving data transmitted from the end devices 302.

It will be appreciated that in a further embodiment a single radio may provide the functions of both of the radios 310, 312. Additionally, in a further embodiment one or both of the radios 310, 312 may be configured to provide only a single function (such as transmitting or receiving) and an additional radio (or radios) may be provided to provide the other of the functions. For example, there may be four radios present in the gateway 300: one for transmitting to the end devices 302, one for receiving from the end devices 302, one for transmitting to the satellite 304 and one for receiving from the satellite 304.

The radios 310, 312 may be referred to as transmitters when configured to transmit. The radios 310, 312 may be referred to as receivers when configured to receive. The radios 310, 312 may be referred to as transceivers when configured to provide both functions either simultaneously or at separate times.

The gateway 300 enables communication with the end devices 302 and a range of existing, or future, satellite services, without having to rely on providing a dedicated satellite constellation. The gateway 300 can function with different satellite services that may operate differently from each other.

The satellite 304 can communicate with the remote server 316 which may be located on a cloud service 323. The remote server 316 may be Earth based or spaced based. As described for the prior art, an end-user 318 can access the data measured by the end devices 302 by accessing the cloud service 323.

The end user 318 may, for example, access the cloud service 323 using an internet enabled computer or a smart phone. The cloud service 323 may, for example, be accessible using a standard web browser, a dedicated software package or a mobile application. It will be appreciated that in a further embodiment the end user 318 may also access the remote server 316 directly rather than via the cloud service 323. For example a direct wired connection may be used to enable an end user 318 to interact with the remote server 316 when the remote server 316 is not located on a cloud service or similar network.

The end-user 318 may choose to view or export the payload data generated at the remote site where the gateway 300 and end devices are located, or the data may be provided to another system.

It will be appreciated that the term cloud service 323 is used generically to refer to the internet or any similar network. For example, such a network may be deployed in isolation from the internet. Furthermore, the end-user 318 may interact with a separate network/cloud service from the one that initially receives the data. The part of the cloud service 323 that the end-user 318 interacts with to access the remote server 316 may be referred to as an application server or application layer (not shown).

The inclusion of the first server 306 within the gateway 300, rather than located remotely as part of the internet or cloud service 106 of the prior art means that the "always-on" shortcoming of the prior art gateway 104 is overcome. The first server 306 acts to "spoof" the internet backend and makes the gateway 300 "think" is has a connection to the internet or cloud service 323 even when no connection is available of intermittent. This enables the gateway 300 to function even when not connected to the remote server 316. Therefore the gateway 300 can function when a communication link between the first server 306 and the remote server 316 is intermittent, for example due to an unavailability of the satellite 304.

Figure 2:
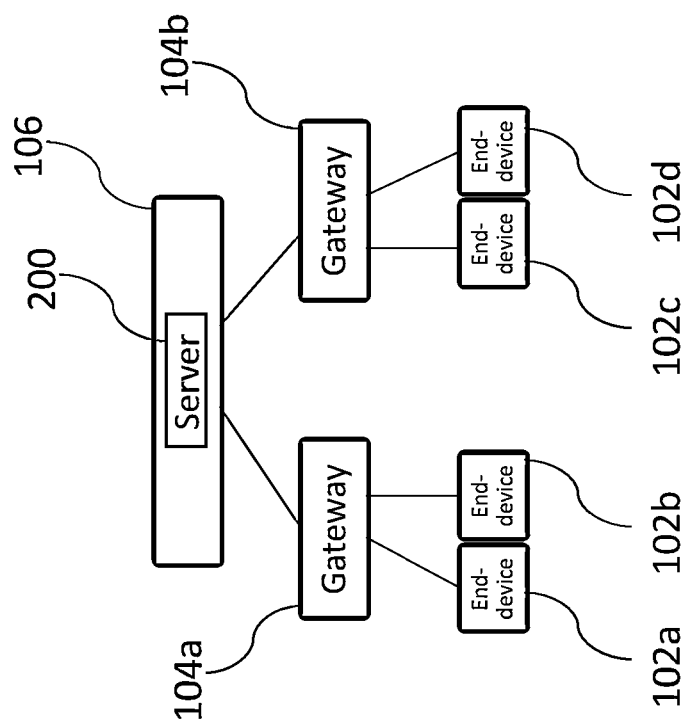
FIG. 2 is an alternative schematic of an IoT network of the type shown in FIG. 1(a)

Typically a server will be located remotely from the gateway, as discussed for FIG. 2. However, the inclusion of the first server 306 within the gateway 300 itself brings the functionality of the first server 306 to the gateway 300. Referring to FIG. 2, when located on the cloud service 106 and remote from the gateway (for example 104a) the server 200 can be configured to carry out tasks ranging from: allowing a user to add/remove gateways (for example 104a, 104b), add/remove (onboard) end devices (for example 102a, 102b, 102c, 102d) to connect to these gateways (104a, 104b) and provide a place for the gateways (104a, 104b) to forward the data they receive from the end devices (102a-102d).

Therefore, in the first state the first management layer 308 may be configured to control the first server 306 within the gateway 300 to enable one or more of the following at the gateway 300: allowing a user to add and/or remove other gateways; allowing a user to add and/or remove end devices for connection to the gateway 300, or another gateway, and to provide storage for data received at the gateway 300.

In the present embodiment, the end devices 302 and the first server 306 communicate using a low power wide area network (LPWAN) communication protocol such as LoRaWAN. The use of the first server 306 within the gateway 300 "breaks" the LPWAN protocol. In the present embodiment, the first server 306 "spoofs" the LPWAN backend.

In further embodiments the end devices 302 and the first server 306 may communicate using a wired connection or alternatively, using 4G, 5G or further generations of mobile network technology.

LoRaWAN may be described as a "network-intensive" protocol: intensive in the sense that due to the simple and minimalistic approach for the end devices 302, the backend systems (specifically, the servers) are responsible for most of the logic. A satellite network is "flawed" due to intermittent connectivity and therefore cannot handle the network intensiveness means there is a requirement to shift the server to the gateway as is present in the gateway 300.

The ability to "break up" the LPWAN communication protocol using the first server 306 enables the gateway 300 to function without an always-on and effectively infinite communication link between the gateway 300 and the cloud service 323, whilst at the same time enables the gateway 300 to remain completely compatible with end-devices that use the LPWAN protocol for communication.

As discussed previously, and with reference to FIGS. 1(a), 1(b) and FIG. 2, communication protocols used for IoT, such as LPWAN protocols require a continuous, unlimited, unbroken link between the end device (the IoT devices 102) in the field and the server 200 on the internet/cloud (the cloud service 106) that manages all the devices for a user/customer. Through this unbroken link, the server 200 and gateway 104 continuously exchange a large amount of data/information that is key to ensuring the whole end to end link from the gateway 100 to the server 200 on the cloud service 106 remains operational.

As discussed previously, the server 200 is ultimately in charge of adding/removing gateways 104, IoT devices 102, and generally managing the entire deployment (which can consist of multiple gateways connected to the internet and multiple end-devices connected to each gateway, as is shown in FIG. 2). Satellite links are not like wired internet connections in that they are limited in bandwidth, expensive to run (cost per unit data exchanged, but also cost in electrical budget to have transmitter running) and depending on the type of satellite used are not always available for communication.

Communications protocols used for IoT, such as LPWAN, cannot function over an intermittent or flawed link, therefore to enable a gateway to be LPWAN compatible with devices out of the box (without requiring modifications or customisations), the protocol, in effect, needs to be broken up and reengineered in such a way that is invisible to the end devices yet enables the gateway to function across the satellite link and its "peculiarities".

The inclusion of the first server 306 on the gateway 300 means that the gateway 300 is compatible with the LPWAN protocol as the functionality of the internet/cloud server (labelled as the "server 200" in FIG. 2) is in effect moved onto the gateway 300 itself such that the LPWAN protocol functions as though it is communicating across a continuous connection.

The first server 306 onboard the gateway 300 is scaled down to function on the gateway 300 yet retain all the functionality required to spoof the LPWAN backend, to satisfy the needs of the protocol and hereby ensuring compatibility with the off the shelf devices end devices 302.

Hosting the first server 306 on the edge (on site) as part of the gateway 300 provides the ability to manage and control end devices 302 and the gateway 300. The first server 306 comprises a first management layer 308 that controls the first server 306 to provide the required functionality to manage, control and communicate with the end devices 302 when in the first state.

The first management layer 308 is designed to interface the first server 306 which provides the intelligence that manages the end-to-end communication of data to/from the remote server 316 on the cloud service 323 via the satellite 304. This includes the end-device payload data (for example sensor measurements taken by the end devices 302) but also all other data required to ensure the other elements of the end-to-end chain function in unison.

The first server 306 may comprise a processor for carrying out instructions to control the components of the gateway 300. The first server 306 may comprise a memory storage device for holding instructions to be carried out by the processor. The first server 306 may be implemented in hardware and/or software in accordance with the understanding of the skilled person. The first management layer 308 may access and use the processor and memory element of the first server 306 to provide the required functionality to control the first server 306.

Electrical components may be packaged into the gateway 300 on which software runs. The gateway 300 is configured to connect to the remote server 316 on the cloud service 323 on the internet via the satellite 304.

The gateway 300 may be deployed on site where a customer/user is needing the connectivity—say a mining company wants to monitor various parts of a mine, the gateway 300 would be deployed within or in the vicinity of said mine. The gateway 300 may be configured to be powered by at least one of a renewable energy source (not shown), mains power (not shown), or a battery 314. The gateway 300 may be mounted on to an existing structure or a dedicated mounting.

One of the major limitations of traditional gateway-centred IoT communication solutions is the reliance on local infrastructure for power and data—thus limiting their deployment anywhere outside of built up areas. As an alternative to mains power, using a renewable energy source or the battery 314 means that, in the present embodiment, the gateway 300 has the ability to run completely off-grid. Therefore, the gateway 300 is suitable for use in remote parts of the world. Additionally, the satellite connectivity ensures the independence on communication infrastructure. As the gateway 300 may be configured to run completely off-grid, the service provided by the gateway 300 can be deployed where no power or communication infrastructure is present whatsoever.

The gateway 300 may comprise one or more interfaces to enable coupling to various sources of renewable power, such as wind generators and solar panels. Additionally, battery packs may be provided to compensate for drops in power generation provided by the renewable power sources.

In the present embodiment, the radio 312 is an LPWAN radio within which the end devices 302 can be connected (once onboarded) and can communicate with the gateway 300. Furthermore, the radio 310 is a satcom radio to enable the gateway 300 to communicate with the satellite.

The antenna 313 (an LPWAN antenna) may, for example, be a patch antenna or a monopole. The antenna 311 (a satcom antenna) may, for example, be a dish, a flat panel antenna or a small patch antenna. It will be appreciated that other antenna types may be used, in accordance with understanding of the skilled person.

The gateway 300 may contain the necessary electronics and software within a housing, or casing. The gateway 300 may be connectable to various appendages such as power sources (for example the battery 314) and the radios 310, 312. As such, the power sources and the radios 310, 312 may be removably connectable to the gateway 300.

In the prior art system (the IoT network 100), onboarding of IoT devices 102 is typically carried out at a location that is distant from the gateway 104 and IoT devices 102. For example, by a user using a computer and logging in to the cloud service 106. "Onboarding" refers to the addition and authorisation of IoT devices in an IoT network to enable the gateway 300 to communicate with said IoT devices. In the present disclosure, the gateway 300 enables IoT devices 302 to be onboarded at the gateway 300 itself and without having to "log in" to the cloud service 106. The onboarding at the gateway 300 is enabled by the inclusion of the first server 306 in the gateway 300 and in particular, the first management layer 308 is configured to enable onboarding of end devices 302 at the gateway 300.

In a further embodiment, the gateway 300 may be configured to enter into a power conservation state for at least a portion of a time period.

The gateway 300 may be configured to enter the power conservation state for at least a portion of the time period when at least one of the end devices 302 and/or the remote server 316 are not communicating with the gateway 300.

The power conservation state may comprise turning off one or more sub-components of the gateway 300 or having one or more sub-components of the gateway 300 enter a low power state.

It is preferable that the gateway 300 as a whole will not be powered down as in an off-state it won't be able to receive data sent by the end devices 302. For example, the sub-component of the gateway 300 that is the largest power consumer in the gateway 300 is the radio 310 for communication with the satellite 304 and therefore it is desirable to turn off the radio 310 when it is not needed.

Duty cycling refers to turning on a system when it is needed and turning it of when it is not. The ability to duty-cycle the connection of the gateway 300 using the radio 312 to the satellite 304 (the satellite backhaul communication link) is beneficial as having a satellite link active is costly both in terms of monetary cost of using the link but also in running costs for the gateway 300 (for example, relating to the power consumption of the transmitter).

The second management layer 320 may be part of the cloud service 323 when the remote server 316 is located on the cloud service 323 and therefore accessible to the end-user 318 by use of the cloud service 323. As such, in effect, a super-management layer (308+320) is formed by the two management layers 308, 320 that oversee the entire operation of the gateway 300.

The separation of the super-management layer (308+320) into two parts at different locations enables control of the first server 306 of the gateway 304 locally using the first management layer 308 when a satellite connection is unavailable (the first state as described previously), with remote control being provided by the second management layer 320 when the satellite connection is available (the second state as described previously).

For example, the second management layer 320 may be configured to enable the onboarding of end devices 302 remotely and distant from the gateway 300 in addition, or as an alternative to, the onboarding functionality provided by the first management layer 308.

Figure 1:
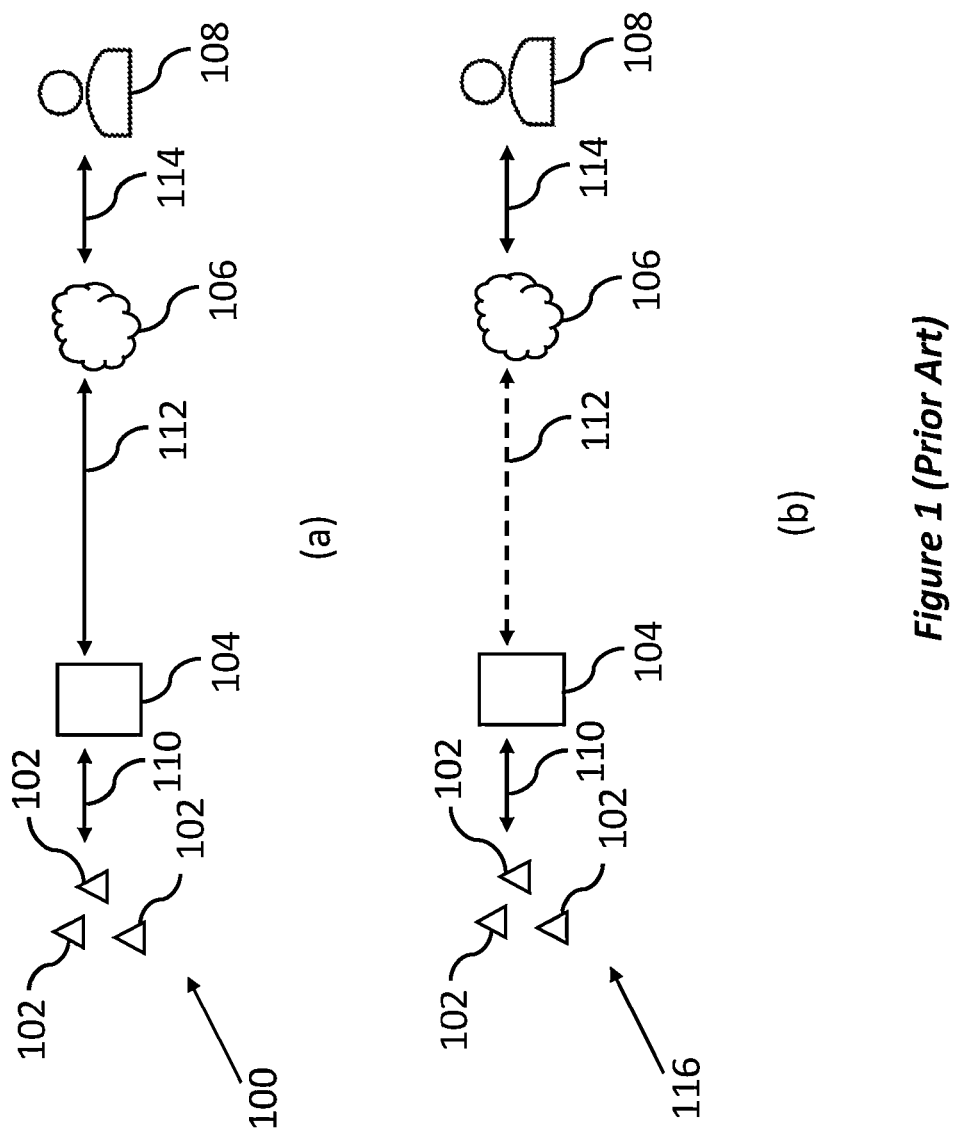
FIG. 1(a) is a schematic of a typical IoT network and FIG. 1(b) is a schematic of an IoT network having an intermittent or broken connection.
FIG. 1(c) is a schematic of a satellite communication network and FIG. 1(d) is a schematic of an IoT network using a dedicated satellite constellation.
Figure 1:
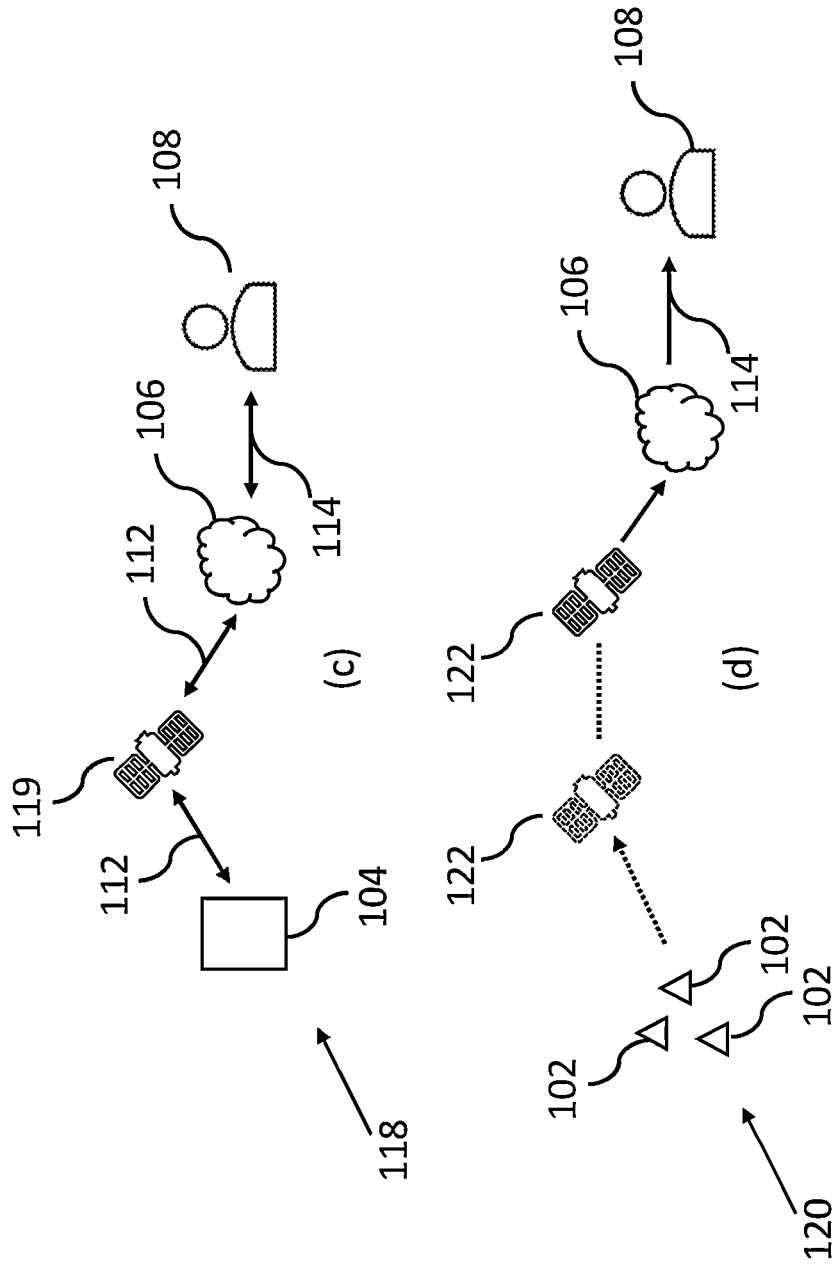

As discussed previously, onboarding devices means carrying out the steps necessary to allow them to connect to and use the service. A compatible device won't be allowed to send its data across (and receive its data from) the communication link unless onboarded. The onboarding of an LPWAN device is a feature of the LPWAN protocol/standard and is handled by the server which is located on the cloud service 106 in the prior art system as shown in FIG. 1(a). In the present disclosure, onboarding remains compatible with the LPWAN protocol standard but can be done either at the gateway 300 (using the first server 306) or at the cloud service 323 (using the second management layer 320) which means that this key functionality can be carried out both on-site and off-site of the deployment.

In the second state the second management layer 320 may be configured to control the first server 306 within the gateway 300 to enable one or more of the following remote from the gateway 300: allowing a user to add and/or remove other gateways; allowing a user to add and/or remove end devices for connection to the gateway 300, or another gateway, and to provide storage for data received at the gateway 300.

In a further embodiment where multiple gateways 300 are deployed, the second management layer 320 may be used for more than one gateway, with the respective local management layers of each gateway being combined with the second management layer 320 to form the "super-management layer".

The super-management layer (308+320) enables control and management over all deployments of gateways 300 and end devices 302. The super-management layer (308+320) caters for the added need of managing the first servers 306 as well as the end devices 302. Furthermore, the super-management layer (308+320) is used to meet the needs to manage the, or each, gateway 300 all the while working within the constraints of the not-always-on communication link with the satellite 304.

Part of the super-management layer (308+320) is present on the gateway 300 (namely, the first management layer 308), while the remainder is on the cloud service 323 (the second management layer 320). The two management layers 308, 320 communicate via the satellite link, exchanging the information required to ensure a seamless end-to-end communication service.

In operation the first management layer 308 and the first server 306 act to ensure the "always-on" requirement of the LPWAN protocol is met. The second management layer 320 may be configured to provide at least part of the functionality of the first management layer 308 and also to provide the necessary functionality to interact with multiple gateways on the network and their management layers. Furthermore the second management layer 320 may be configured to function when out of contact with one or more of the gateways on the network, for example, when the satellite 304 is out of range.

As discussed previously, known gateways do comprise an option of running a network server on-board, and this in effect "spoofs" the LPWAN protocol. However, this is merely to create an isolated IoT deployment that still functions like the IoT network 100 in FIG. 1(a) by forwarding data packets back and forth between the IoT devices 102 and the end user 108. Such a system is unsuitable for functioning when the connection to the cloud service 106 is broken or is intermittent and such a system is therefore unsuitable for communication via a satellite. Furthermore bringing the server onboard the gateway means that the functions of the server, for example for onboarding, is carried out at the gateway itself. Additionally a series of gateways each having a server onboard and deployed in this way do not interact.

The gateway 300 as described herein provides a method of enabling remote control of the gateway 300 via the second management layer 320 that enables functions such as remote onboarding of end devices 302. It will be appreciated that other functionality as enabled by the first server 306 may also be carried out remotely in accordance with the understanding of the skilled person.

In summary, the super management layer (308+320) may be used to synchronise cloud and gateway configurations; to optimises a satellite link across all gateways in the field; to provide centralised monitoring and control of gateways in the field; to enable remote debugging and fixing of issues; and to control the piping of information to/from gateways in the field.

Figure 4:
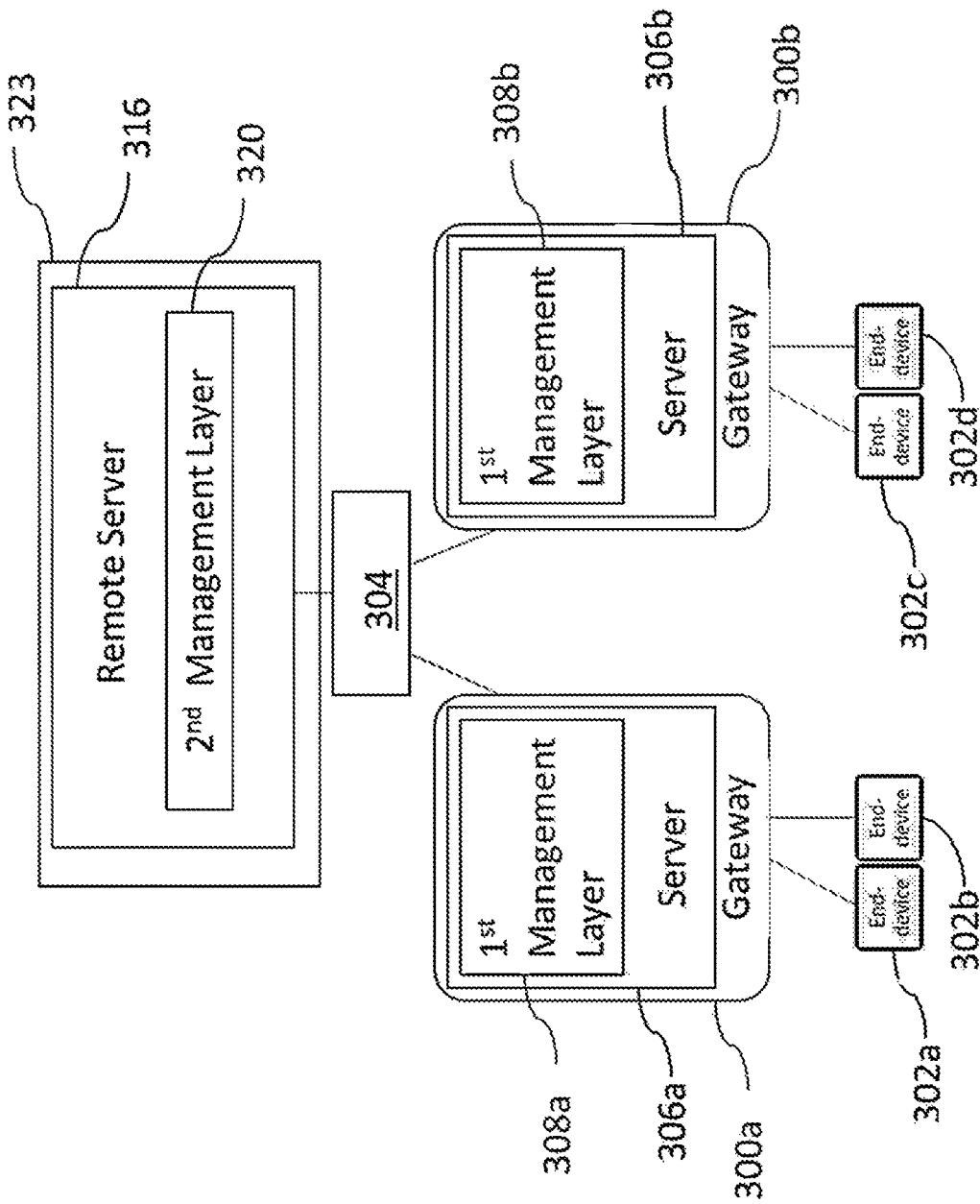
FIG. 4 is an alternative schematic of a communication network of the type shown in FIG. 3(b)

FIG. 4 is an alternative schematic of a communication network of the type shown in FIG. 3(b). Common features are represented by common reference numerals and variables. In FIG. 4, two gateways are shown each having two connected IoT devices. There is shown a first gateway 300a and a second gateway 300b. The first gateway 300a is for communication with the end devices 302a, 302b and comprises a server 306a and a management layer 308a. The second gateway 300b is for communication with the end devices 302c, 302d and comprises a server 306b and a management layer 308b. The first and second gateways 300a, 300b function as described for the gateway 300, as will be clear to the skilled person.

A super management layer is formed by the second management layer 320 and the management layer 308a, and a further super management layer is formed by the second management layer 320 and the management layer 308b.

The inclusion of the second management layer 320 enables the control of multiple gateways 300a, 300b remotely by interaction with their respective management layers 308a, 308b and servers 306a, 306b. Therefore it is not necessary that the gateways 300a, 300b function in isolation from each other as is the case in the prior art. For example a measurement received by the gateway 300a from the end-device 302a may be used to trigger a measurement process to be carried out by the end-device 302c, which is associated with the gateway 300b and may be located a substantial distance from the network provided by the gateway 300a. As such, the inclusion of the second management layer 320 can enable the gateways 300a, 300b to act cooperatively and it is not necessary that they function in isolation.

It will be appreciated that in further embodiments additional gateways may be provided, each have servers comprising management layers that can interact with and communicate with the second management layer 320 provided on the cloud service 323.

A network comprising multiple gateways that can communicate with each other, such as the IoT network shown in FIG. 4 may be described as a distributed network.

In a further embodiment, the gateway 300 may be configured to buffer data prior to communication to the remote server 316. As discussed previously, traditional IoT gateways such as the gateway 104 shown in FIG. 1(a) typically act as simple relays, forwarding data in both directions across the two communication types (wireless LPWAN between the IoT devices 102 and the gateway 104, and wired internet or 4G between the gateway 104 and the cloud service 106). The gateway 300 of the present disclosure may buffer the data locally at the gateway 300, by storing data received from the end devices 302 until it needs to be sent on to the satellite 304.

The buffered data may for example be data received from one or more of the end devices 302 or may be data to be sent to the end devices 302. Alternatively, the buffered data may be management data generated by the gateway 300 itself, for example relating to general "housekeeping" and relating to the functioning of the gateway 300.

The ability to buffer payload and other data in both directions unlocks the ability to closely control how and when data is transferred across the satellite backhaul (between the gateway 300 and the satellite 304) and LPWAN links (between the end devices 302 and the gateway 300) which enables the gateway 300 to handle a multitude of protocols, technologies, transmit strategies, etc.

The first server 306 may comprise a memory element 322 for storing the data as part of the buffering process. For example, in use data may be received at the gateway 300 from one of the end devices 302. If the satellite 304 is not located in an appropriate position for transmission of data from the gateway 300 to the satellite, then the data can be buffered by storing the data in the memory element 322. When the satellite 304 is in a suitable position to receive data from the gateway 300, the gateway 300 can then proceed to transmit the data stored in the memory element 322.

In a further embodiment, the buffered data may be ranked based on its importance and transmitted to the satellite 304 in order of importance. For example, assuming the end devices 302 are measuring both temperature and humidity and there is an urgency for the end user 318 to receive the temperature data, the gateway 300 may be configured to prioritise sending the temperature data in the limited time period over which the satellite 304 is appropriately located to receive transmissions from the gateway 300.

In a further example a set of regular data capture points could be considered non-critical most of the time and set to buffer for a time period, for example 12 hours, thus aggregating payloads and sending it all in one go every half day. If the value of a measurement were to pass a certain threshold (for example, a temperature above a certain threshold level), the smart gateway 300 could be set to consider this data critical and have the data sent to the satellite 304 immediately or as soon as possible. This functionality enables a wide range of customisation depending on user needs and enables the service provided by the gateway 300 to scale its performance depending on a change in circumstance.

The second management layer 320 may receive an input from the end user 318 that is communicated to the gateway 300 via the satellite 304 that is used to update the conditions under which data is buffered. Therefore the inclusion of the second management layer 320 enables remote control of aspects of the gateway 300 and its operation. It will be appreciated that the control provided remotely by the inclusion of the second management layer 320 is not limited to the data buffering conditions. For example, alternatively, or in addition to, the end-user 318 may control the duty cycling of all or part of the gateway 300 remotely via the second management layer 320.

The second management layer 320 may also be configured to enable remote updating of gateway 300 software. This may be triggered by a user input or alternatively may be automatic when an update is available.

It will be appreciated that the ranking/grading of the buffered data may be otherwise determined in accordance with the understanding of the skilled person.

It will be appreciated that although the gateway 300 has been described with reference to LPWAN, and specifically LoRaWAN, in further embodiments the gateway 300 may be adapted for use with different protocols and technologies to make up the overall end-to-end service. For example, the gateway 300 may function over a wifi or Bluetooth connection. Additionally, the gateway 300 is not limited to any single satellite communication protocol or technology and different satellites and satellite constellations can be leveraged to provide the backhaul link. Different satellites can require different communication strategies, performance, hardware, etc. In effect, the gateway 300 may be described as communication protocol and technology agnostic. In summary, the smart gateway 300 may be configured to forward the necessary data across any combination of technologies, protocols and strategies in accordance with the understanding of the skilled person.

The gateway 300 may comprise an edge computing device 324 configured to decrypt, analyse and/or process data received from one or more of the end devices 302 prior to storage using the memory element 322 and/or prior to transmission to the remote server 316. Processing of the data may comprise applying mathematical operations and/or comparing the data to one or more threshold values.

The edge computing device 324 is configured to process data received from the, or each, of the end devices 302. This enables processing of the received data to be carried out on site at the gateway 300 before the data is forwarded to the cloud service 323 via the satellite 304. The edge computing device 324 may be used to decrypt and/or analyse the received data.

Carrying out processing of the data at the gateway 300 using the edge computing device 324 may enable a reduction in the quantity of data that is required to be transmitted to the satellite 304 from the gateway 300. The reduction in data to be transferred to the satellite 304 is particularly valuable when the IoT network comprises multiple gateways and IoT devices, for example in a case where the IoT network shown in FIG. 3 is scaled to include multiple gateways 300 and multiple end devices 302.

It is preferable that an IoT network is scalable, for example to hundreds or thousands of gateways and/or end devices, and therefore the ability to reduce the burden on bottlenecks relating to increasing quantities of data with increasing IoT network size that can be provided by edge computing is particularly valuable. Edge computing can be used to provide an optimised IoT system for use with satellite communication that provides a backhaul with variable performance.

"Backhaul" describes the communication link between the gateway 300 and (hauled back to) the cloud service 323. In the examples described herein, the backhaul describes the communication link from the gateway 300 to the cloud service 323 via the satellite 304.

Figure 5:
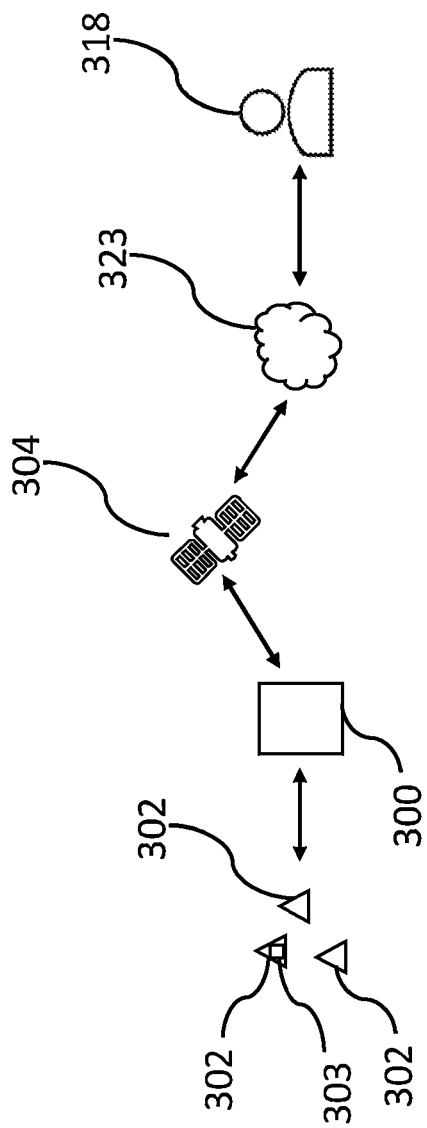
FIG. 5 is an alternative schematic of the communication network comprising the gateway as shown in FIG. 3(b)

FIG. 5 is an alternative schematic of the communication network comprising the gateway 300 as shown in FIG. 3(b). Common features are represented by common reference numerals/variables between Figures.

Figure 6:
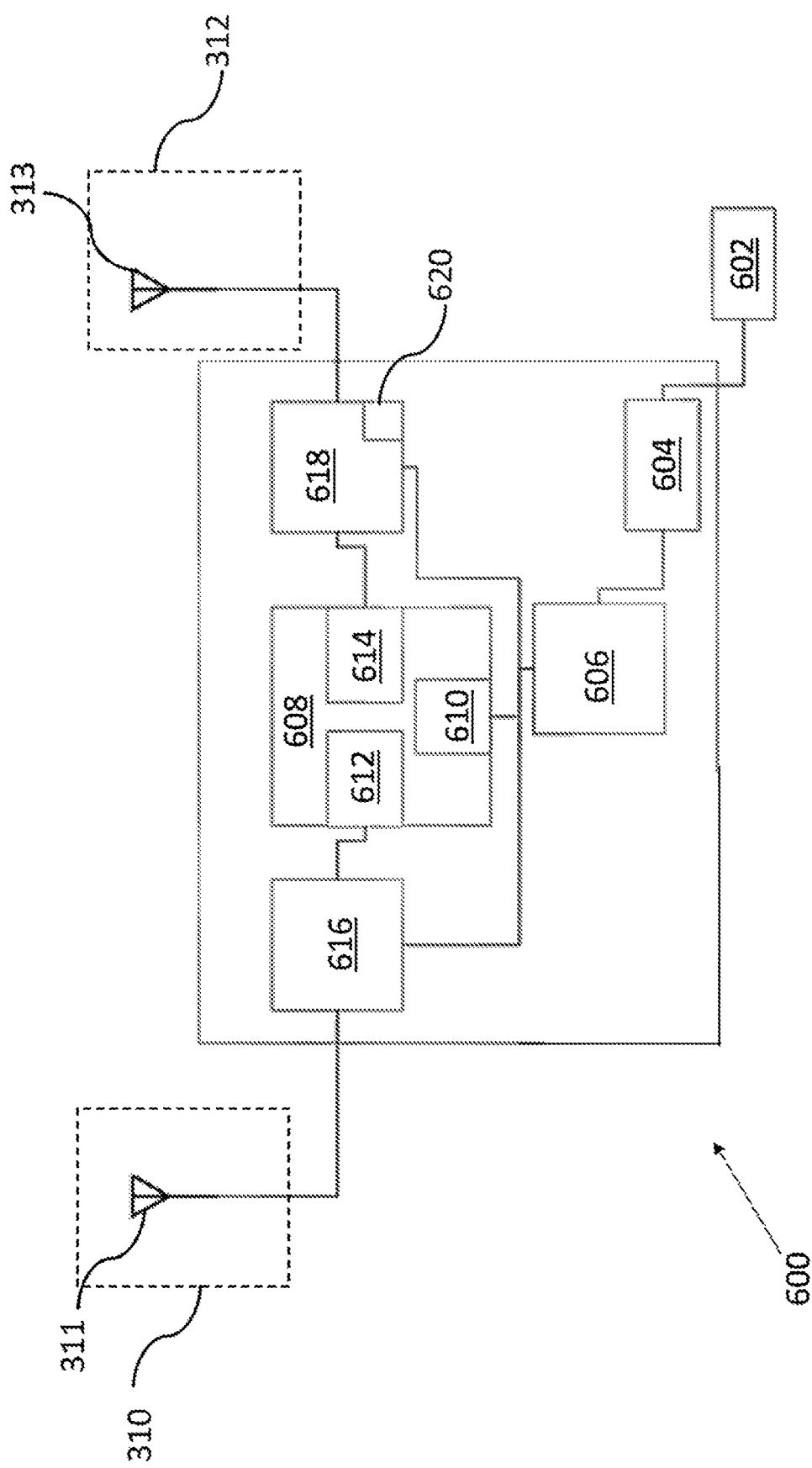
FIG. 6 is a schematic of a gateway in accordance with a second embodiment of the present disclosure.

FIG. 6 is a schematic of a gateway 600 in accordance with a second embodiment of the present disclosure. The gateway 600 represents a specific embodiment of the gateway 300 and as such common features are represented by common reference numerals and variables. The gateway 600 functions as described previously for the gateway 300 as will be clear to the skilled person.

In operation, the gateway 600 can be powered by a mains power supply 602 which is coupled to an AC interface 604. The AC interface 604 provides power from the mains power supply 602 to the power regulation and distribution unit 606, which provides regulated power to the electrical components of the gateway 600.

It will be appreciated that in the present embodiment the mains power supply 602 is not part of the gateway 600 itself and the gateway is couplable to the mains power supply 602. The gateway 600 comprises the AC interface 604 and the power regulation and distribution unit 606 however it will be appreciated that in a further embodiment these components may be provided separately.

The gateway 600 comprises a computer 608 that comprises the first server 306 (not shown) and the first management layer 308 (not shown). The computer 606 comprises a memory element 610 which may correspond to the memory element 322 as described previously. The memory element 610 is a steady state storage device in the present embodiment. The computer 608 may be a single board computer.

The computer 608 further comprises a universal asynchronous receiver interface (UART) data interface 612 and a serial peripheral interface (SPI) data interface 614. The computer 608 comprises a processor.

The gateway 600 comprises an interface 616 and an interface 618. Each of the interfaces 616, 618 and the computer 608 are coupled to the power regulation distribution unit 606 and receive power from said unit 606 during operation.

In the present embodiment the interface 616 is a SatCom interface. In the present embodiment, the interface 618 is a LoRa radio comprising a power amplifier (PA) 620.

Figure 7:
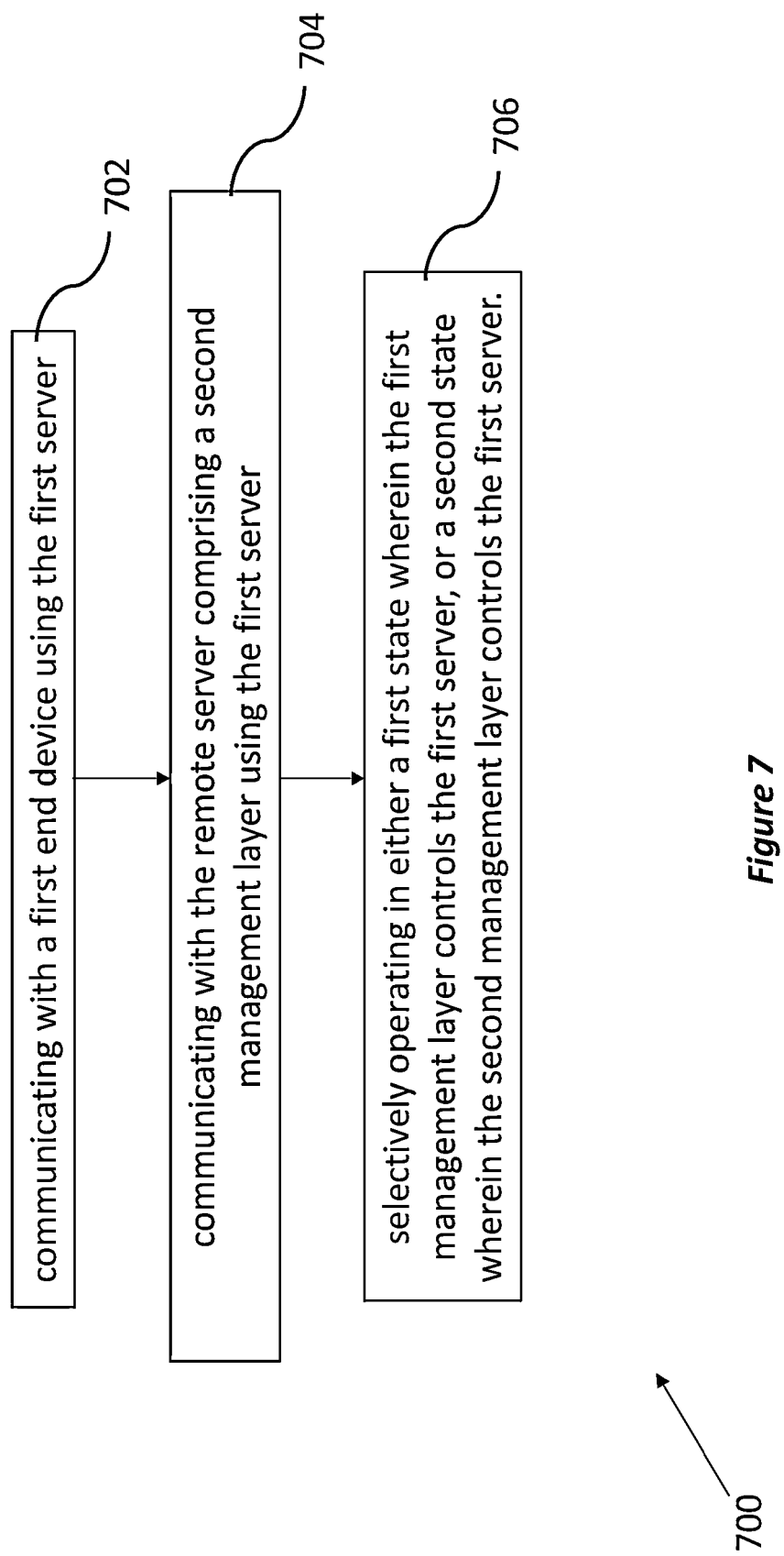
FIG. 7 is a flow chart of a method of communicating between an end device and a remote server using a gateway of the present disclosure in accordance with a third embodiment of the present disclosure.

FIG. 7 is a flow chart of a method 700 of communicating between a first end devices and a remote server using the gateway 300, or the gateway 600, in accordance with a third embodiment of the present disclosure.

The method 700 comprises communicating with the first end device using the first server at a step 702, communicating with the remote server comprising a second management layer using the first server at a step 704, and selectively operating in either a first state wherein the first management layer controls the first server, or a second state wherein the second management layer controls the first server at a step 706.

The gateway as described herein enables an IoT communications network that operates via satellite and can in effect be deployed anywhere, even in areas with poor communications and power infrastructure. As discussed previously, the gateway may be positioned in a remote location where the end-devices are located and can be powered from mains power or renewables (solar panel and/or small wind generator) when no infrastructure is present locally. An internet portal, which is an example of an application layer as discussed previously, may be provided to enable end users to access data measured by the IoT devices of the network to be accessed online. Additionally, the internet portal may include data visualisation and analytics tools.

The gateway disclosed herein is adapted to the low data-rate end-devices as required for industrial IoT. The gateway may be adapted to function with a wide variety of off-the-shelf end-devices using standardised communication protocols. The gateway may be adapted to work with a wide variety of satellite communication providers and the varied technologies and techniques associated with these (for example, frequencies, waveforms, pointing requirements, antenna types and communication strategies).

One or more gateways as disclosed herein may be provided as part of a communication network. The communication network may for example comprise multiple gateways each associated with one or more end devices and connectable to the remote server.

The system herein may be scaled efficiently by deploying multiple gateways, of the type described herein, and/or multiple end devices. The second management layer 320 enables the multiple gateways to be controlled as a single IoT network. This enables the benefits of high-resolution data gathering. For example, there may be a thousand end devices each gathering data. The gateway as disclosed herein may incorporate end-to-end security (encryption, authentication) to ensure customer/user data is secure. The system described herein provides gateways that may be used in a non-isolated distribution as part of a multi-gateway network, where the gateways are controllable from a location remote to the location where the gateways are deployed.

The gateways disclosed herein provide seamless, turnkey connectivity solutions aimed at low data-rate sensor-type communication that can be deployed anywhere in the world. Much like an internet service provider (ISP) which supplies a modem to the end-user/customer for them to setup at home and to which they connect their end devices (via Wi-Fi or wired connectivity), the service enabled by the gateway may supply a gateway to which end devices (sensors, actuators, etc.) can be connected and/or authenticated. Once connected to an operational gateway, data can then be sent from the end-devices to a dedicated internet portal and vice versa.

FIG. 9(a) is a schematic of an IoT network 900 comprising an onboarding device 901 in accordance with a fourth embodiment of the present disclosure. The IoT network 900 comprises a gateway 904 and a registration server 906.

In the present example the onboarding device 901 is configured to enable an end device 902 to be registered with the IoT network 900 if not currently registered, and is also configured to enable an end device 902 already registered to the IoT network 900 to be removed from the IoT network 900.

It will be appreciated that in further embodiments the onboarding device 902 may be configured to provide only one of these functions. Specifically, in a further embodiment, the onboarding device 902 may only be configured to enable end device 902 registration, and in another embodiment the onboarding device may only be configured to enable end device 902 removal.

It will be appreciated that the terms "registering" and "onboarding" are used interchangeably herein. It will also be appreciated that the removal of an end device 902 from the IoT network 900 means that its communications are no longer accepted by the gateway 904. After removal an end device 902 may be registered the IoT network 900 again using the onboarding device 901, or another means in accordance with the understanding of the skilled person.

The end devices 902 may, for example, comprise one or both of a sensor and an actuator.

Figure 8:
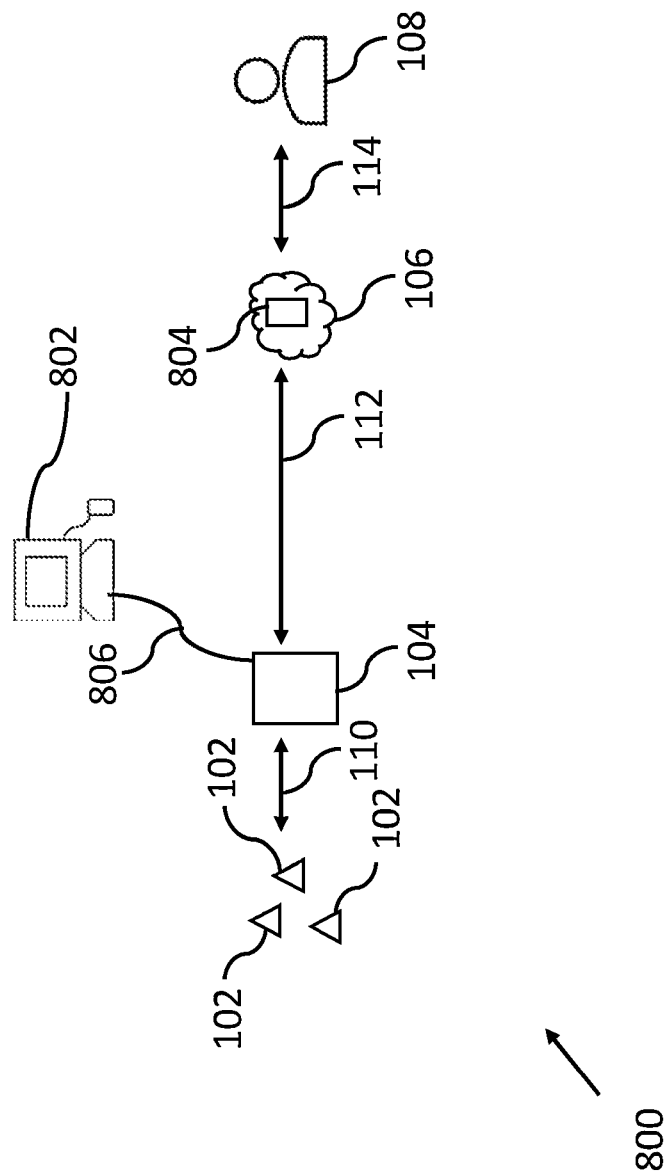
FIG. 8 is a schematic of an IoT network as is known in the prior art.

It will be appreciated that the gateway 904 and the end device 902 may function as described previously for gateways 904 and end devices in other IoT networks. For example, and with reference to FIG. 8, the gateway 904 may correspond to the gateway 104 and the end device 902 may correspond to one of the end devices 102.

The onboarding device 901 comprises a transmitter 907 configured to transmit a command signal 908 to the gateway 904 using a long range wireless communication protocol. The content of the command signal is dependent on an identifier 909 that is associated with the end device 902 that is to be registered or removed from the IoT network 900. The identifier 909 may, for example, be the devEUI as described previously, or alternatively may be another type of identifier such as a code or a PIN. Additionally, the identifier 909 may comprise multiple components, for example a devEUI, a PIN and a code. Each end device 902 may have a unique identifier 909 to distinguish each end device from other end devices.

The gateway 904 is configured to receive the command signal 908 and to provide the command signal 908 to the registration server 906. In the present example the registration server 906 is coupled to the gateway 904 by a wired connection 910. It will be appreciated that in a further embodiment the gateway 904 may be coupled to the registration server 906 by a wireless connection. It will be appreciated that further embodiments may comprise a combination of wireless and wired connections for the coupling between the gateway 904 and the registration server 906.

For registration of the end device 902 the command signal 908 instructs the registration server 906 to register the end device to the IoT network 900. For removal of the end device 902, the command signal 908 instructs the registration server 906 to remove the end device 902 from the IoT network 900.

Providing the command signal 908 to register the end device may be referred to as providing an "onboarding handshake".

It will be appreciated that in further embodiments the command signal 908 may be configured to provide multiple functions. For example the command signal 908 may instruct the registration server to remove one end device whilst registering another, or the command signal 908 may instruct the registration or removal of multiple end devices.

It will be appreciated that the onboarding device 901 will require to be registered to the IoT network 900 itself before it can be used to register or remove end devices 902 from the IoT network 900. In effect the onboarding device 901 is itself an end device which is configured to enable registration and removal of other end devices 902 from the IoT network 900.

When the onboarding device 901 is registered, the gateway 904 will "recognise" the onboarding device 901 and will "understand" that the identifiers 909 being provided by the onboarding device 901 are authentic, and the end devices associated with these identifiers 909 should be added or removed to the IoT network 900 as required.

Authentication may be used to ensure that an authorised user is using the onboarding device 901. The onboarding device 901 may also comprise functionality to enable a user to register (or remove) an end device from one of multiple gateways.

In a further embodiment, a single identifier 909 may be associated with multiple end devices. In this case, multiple end devices, associated with the single identifier 909 may be registered or removed in bulk.

FIG. 9(*b*) is a schematic of an IoT network 912 comprising the onboarding device 901 in accordance with a fifth embodiment of the present disclosure. The IoT network 912 shares features with the IoT network 900 and therefore common features share common reference numerals and variables.

In the present example, a network server 913 located on a cloud service 914 comprises the registration server 906. In the present example, the wired connection 910 is used to couple the gateway 904 to the registration server 906 via the network server 913 on the cloud service 914. It will be appreciated that in a further embodiment, the wired connection 910 may be wireless, and may, for example, be via a satellite link. It will be appreciated that further embodiments may comprise a combination of wireless and wired connections for the coupling between the gateway 904 and the registration server 906.

In the present example a portion of the network server 913 provides the functionality of the registration server 906 to enable onboarding and removal of end devices as previously described.

In each of the embodiments presented in FIG. 9(*a*) and FIG. 9(*b*) the long range wireless communication protocol may be a low power wide area network (LPWAN) communication protocol. The LPWAN communication protocol is LoRaWAN. The transmitter 907 may comprise a LoRa radio.

It will be appreciated that the present disclosure may be applied to other LPWAN communication protocols, including, but not limited to SigFox and NB-IoT. The specification and characteristics of LPWAN communication protocols such as LoRaWAN, SigFox and NB-IoT will be well known by the skilled person.

It will be appreciated that a long range wireless communication protocol such as LPWAN, is distinct from other communication technologies such as Wi-Fi, Bluetooth and Near-field communication (NFC) etc. LPWAN enables low power and long range communication when compared with other technologies which make it particularly suitable for IoT networks where cheap, low power sensors are deployed to collect data over a wide area. IoT networks using LPWAN must adhere to the relevant communication protocol (such as LoRaWAN) which differs substantially from other technologies such as Wi-Fi.

For example, to connect an end device to a Wi-Fi network, the end device itself needs information on the wireless router. This information is typically a wireless router name and a password. This contrasts with LoRaWAN where an end device must be permitted to join the IoT network by onboarding/registering the end device with the registration server 906. In LoRaWAN, connections to the IoT network are controlled centrally by the registration server 906 and the end devices themselves do not need any information on the IoT network to function as part of the IoT network. Therefore, the process of connecting an end device to function in an IoT network using long range wireless communication, such as LPWAN (for example LoRaWAN), differs substantially from the process to connect an end device to function in an IoT network using Wi-Fi.

The gateway 904 may be configured to communicate with the, or each, end device 902 using the same long range wireless communication protocol as issued for communication between the onboarding device 901 and the gateway 904. This provides the onboarding device 901 with the ability to transmit end device 902 identifiers 909 to the gateway 904 securely using the same communication link as that to be used between the end device 902 and gateway 904 during operation. For example sending onboarding info (the identifier) to the gateway 904 via LoRaWAN. It will be appreciated that the gateway 904 may also communicate with the end device 902 and/or the onboarding device 901 using LoRaWAN.

By having the onboarding device 901 and the end devices 902 communicating with the gateway 904 using the same communication protocol it means that there is no requirement for the gateway 904 to include additional hardware components to enable communication over different communication protocols.

In the present examples using LoRaWAN, to onboard an end device the identifier 909 (for example, DevEUI) unique to the end device 902 may be communicated to the registration server 906 to ensure that the end device 902 to be registered can be identified correctly. Another identifier, such as the AppID may also be communicated for an extra level of security.

In a further embodiment the registration server 906 may be configured to onboard the end device 902 to the IoT network based 900, 912 based on the received command signal 908 and a confirmation signal (not shown) received as part of a multi-factor authentication process. This provides a more secure onboarding process.

The multi-factor authentication process may, for example, comprise two-factor authentication. In such a procedure a used may be required to provide two of the following three forms of identification: something they know (for example, a memorised password), something they own (for example, a mobile phone) and something they are (for example, a fingerprint).

In a specific embodiment, a user may be provided with an authorised phone and/or dongle device (something owned) that can ask for an employee pin (something known) or a fingerprint (something they are) to onboard the end device 902 securely. Only authorised employees would be given the phone and/or dongle device, which if lost would still not work without the second feature. Rather than requiring back-end access to carry out the onboarding of each and every end device 902, back-end access would only be required to authenticate the onboarding device 901 of the present disclosure. The onboarding device 901 may then be used in turn to onboard a large number of end devices 902 by users in the field.

Figure 10:
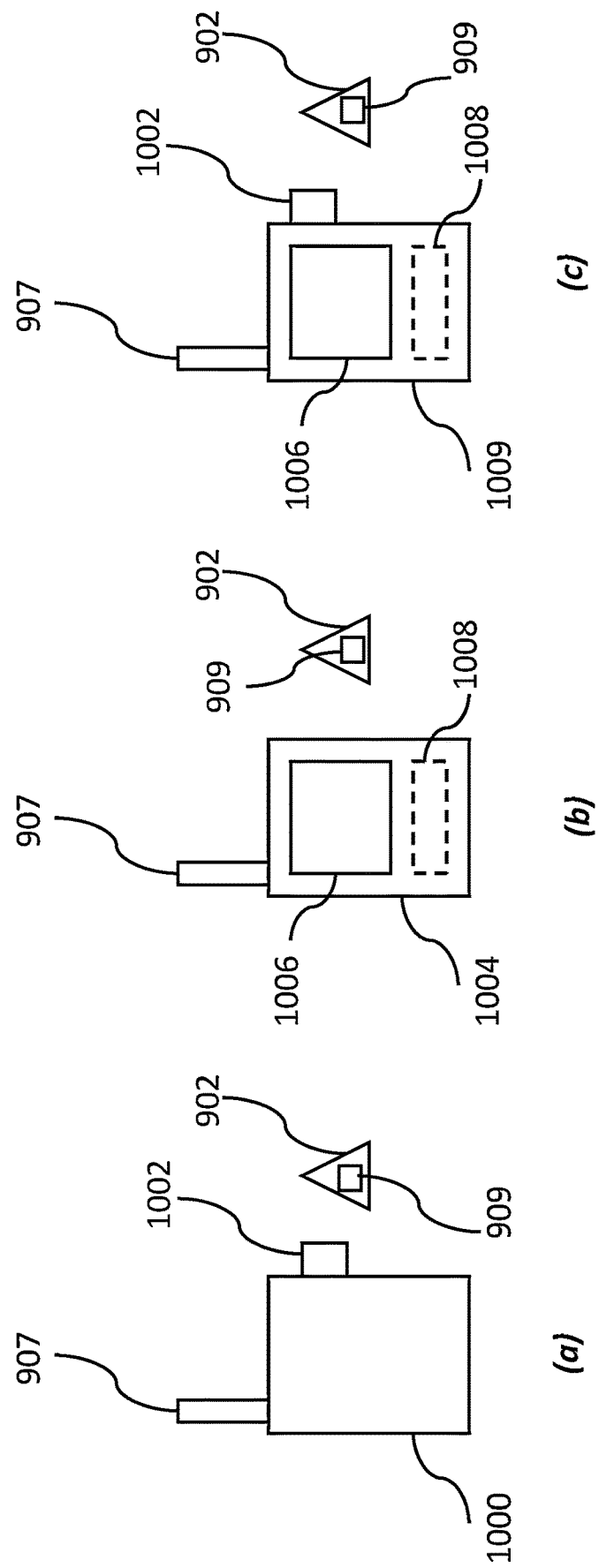
FIG. 10(a) is a schematic of a specific implementation of the onboarding device, in accordance with a sixth embodiment of the present disclosure.
FIG. 10(b) is a schematic a specific implementation of the onboarding device in accordance with a seventh embodiment of the present disclosure.
FIG. 10(c) is a schematic a specific implementation of the onboarding device in accordance with an eighth embodiment of the present disclosure.

FIG. 10(a) is a schematic of an onboarding device 1000 showing a specific implementation of the onboarding device 901 as previously described, in accordance with a sixth embodiment of the present disclosure. Common reference numerals and variables between figures represent common features.

The onboarding device 1000 comprises an electronic reader 1002 configured to read the identifier 909 associated with the end device 902.

The identifier 909 may be provided as at least one of a barcode, a near field communication (NFC) tag and a radio-frequency identification (RFID) tag. Therefore the electronic reader 1002 may be configured accordingly to read at least one of a barcode, an NFC tag and an RFID tag. The barcode may, for example, be a QR code. In such cases, the identifier 909 is encoded in the barcode, NFC tag or the RFID tag and the encoded identifier 909 is decoded by the appropriate electronic reader 1002.

FIG. 10(b) is a schematic of an onboarding device 1004 showing a specific implementation of the onboarding device 901 as previously described, in accordance with a seventh embodiment of the present disclosure. Common reference numerals and variables between figures represent common features.

The onboarding device 1004 comprises an input device 1006 configured to provide a user with an interface to enable a user to manually input the identifier 9009 associated with the end device 902 to be registered or removed and/or to select the identifier 909 associated with the end device 902 to be registered or removed from a list of stored identifiers 909, each identifier 909 stored in the list being associated with a different end device 902. The input device 1006 may, for example be a touchscreen or an alphanumeric keypad. The user may, for example, input the identifier 909 into the input device 1006 as an alphanumeric code where the identifier 909 is an alphanumeric code that is written or otherwise marked on the end device 902, each end device 902 having a unique code.

The onboarding device may comprise a memory element 1008 for storing the list of stored identifiers 909. In a further embodiment the list of stored identifiers 909 may be stored in an external memory element that is not part of the onboarding device 1004, with the onboarding device 1004 accessing the list of identifiers 909 stored in the external memory element, for example, by a wireless connection. The external memory element may for example correspond to a component of a server on a cloud service that may be accessed via the gateway 904.

FIG. 10(c) is a schematic of an onboarding device 1009 showing a specific implementation of the onboarding device 901 as previously described, in accordance with a eighth embodiment of the present disclosure. The present embodiment combines the electronic reader 1002 and the input device 1006 as presented previously, thereby providing a user with multiple means to register or remove an end device, as will be clear to the skilled person.

Figure 11:
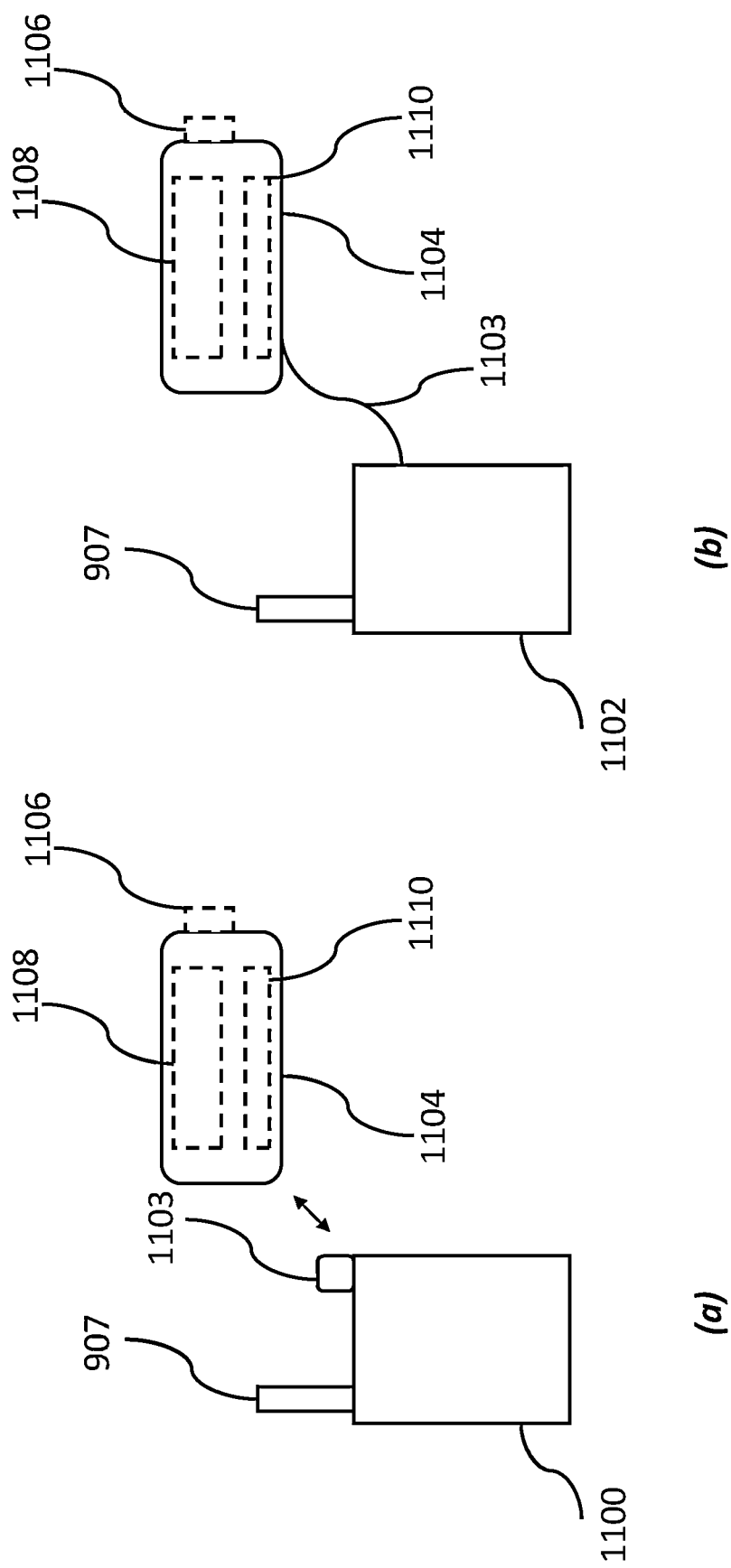
FIG. 11(a) is a schematic of a specific implementation of the onboarding device in accordance with a ninth embodiment of the present disclosure.
FIG. 11(b) is a schematic of a specific implementation of the onboarding device in accordance with a tenth embodiment of the present disclosure.

FIG. 11(a) is a schematic of an onboarding device 1100 showing a specific implementation of the onboarding device 901 as previously described, in accordance with a ninth embodiment of the present disclosure. FIG. 11(b) is a schematic of an onboarding device 1102 showing a specific implementation of the onboarding device 901 as previously described, in accordance with a tenth embodiment of the present disclosure. Common reference numerals and variables between figures represent common features.

Each of the onboarding devices 1100, 1102 comprise a communication interface 1103 configured to enable the onboarding device 1100, 1102 to communicate with an electronic device 1104. The electronic device 1104 is configured to enable a user to control the onboarding device. The communication interface 1103 of the onboarding device 1100 is configured to enable wireless communication between the electronic device 1104 and the onboarding device 1100. It will be appreciated that in this case, the communication interface 1103 may be provided by the transmitter 907, in accordance with the understanding of the skilled person. The communication interface 1103 of the onboarding device 1102 is configured to enable wired communication between the electronic device 1104 and the onboarding device 1102

The communication interface 1103 for wired communication may enable communication, for example, via a universal serial bus (USB), and the communication interface 1103 for wireless communication may enable, for example, NFC or Bluetooth communication.

The electronic device 1104 may comprise an electronic reader 1106 configured to read the identifier 909 associated with the end device 902. The electronic reader 1106 may be configured to read at least one of a barcode, an NFC tag and a RFID tag. The barcode may be a QR code.

The electronic device 1104 may comprise an input device 1108 configured to provide a user with an interface to enable a user to manually input the identifier 909 associated with the end device 902 to be registered or removed and/or select the identifier 909 associated with the end device 902 to be registered or removed from a list of stored identifiers, each identifier stored in the list being associated with a different end device 902. The electronic device 1104 may comprise a memory element 1110 for storing the list of stored identifiers.

Figure 12:
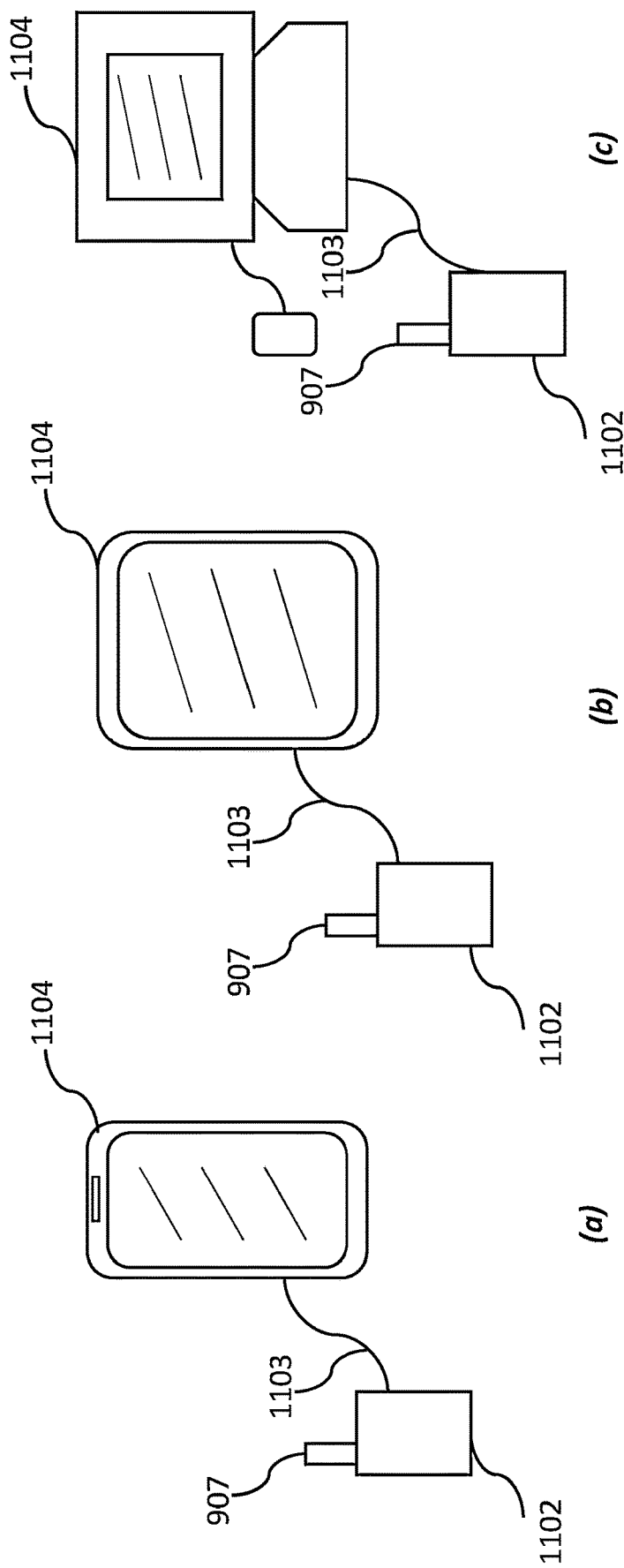
FIG. 12(a) is a schematic of the onboarding device and a specific implementation of an electronic device in accordance with an eleventh embodiment of the present disclosure.
FIG. 12(b) is a schematic of the onboarding device and a specific implementation of the electronic device in accordance with a twelfth embodiment of the present disclosure.
FIG. 12(c) is a schematic of the onboarding device and a specific implementation of the electronic device in accordance with a thirteenth embodiment of the present disclosure.

FIG. 12(a), FIG. 12(b) and FIG. 12(c) are schematics of the onboarding device 1102 and specific implementations of the electronic devices 1104 in accordance with eleventh, twelfth and thirteenth embodiments of the present disclosure, respectively. Common reference numerals and variables between figures represent common features.

FIG. 12(a) is an embodiment where the electronic device 1104 is a mobile phone, FIG. 12(b) is an embodiment where the electronic device 1104 is a tablet, and FIG. 12(c) is an embodiment where the electronic device 1104 is a computer. It will be appreciated that for each of these embodiments, the electronic device 1104 can provide the functionalities as described for the electronic device 1104 of the embodiments presented in FIG. 11(a) and FIG. 11(b). Additionally it will be appreciated that in a further embodiment, the onboarding device 1102 may alternatively be the onboarding device 1100, having a wireless communication interface 1103.

For the mobile phone, tablet and computer examples presented previously, the communication interface 1103 for wired communication may enable communication, for example, via a universal serial bus (USB), and the communication interface 1103 for wireless communication may enable, for example, NFC or Bluetooth communication.

Turning to the embodiment shown in FIG. 12(a), where the electronic device 1104 is provided by a mobile phone, the onboarding device 1102 may be provided as a dongle-type device that is coupled to the phone via a wireless or wired connection. Alternatively, the onboarding device 1102 may be implemented as part of a phone case that is used with the phone, thereby eliminating the hassle of carrying around an additional, separate component and providing a more elegant and ergonomic solution for users.

The mobile phone may be configured to run a smart phone application that enables a user to control the onboarding device 1100 and to communicate with the registration server 906 thereby enabling the user to register or remove end devices 902. The input device 1108 may be provided by the mobile phone's touch screen. The mobile phone's camera and the application may enable reading of the identifier 909 in the form of a barcode (such as a QR code) from the end device 902. The mobile phone may also be configured to enable reading of the identifier 909 if it is provided as an NFC tag or an RFID tag.

As the mobile phone, tablet and computer presented in FIGS. 12(a), (b) and (c), respectively, do not implement hardware for long range wireless communication, for example LPWAN, such as LoRaWAN, an additional piece of hardware is required to provide this functionality. This is provided by the onboarding device 1102. In the present examples, and for a LoRaWAN network, the transmitter 907 comprises a LoRa radio and the communication interface 1103 for communication with the electronic device 1104.

Figure 13:
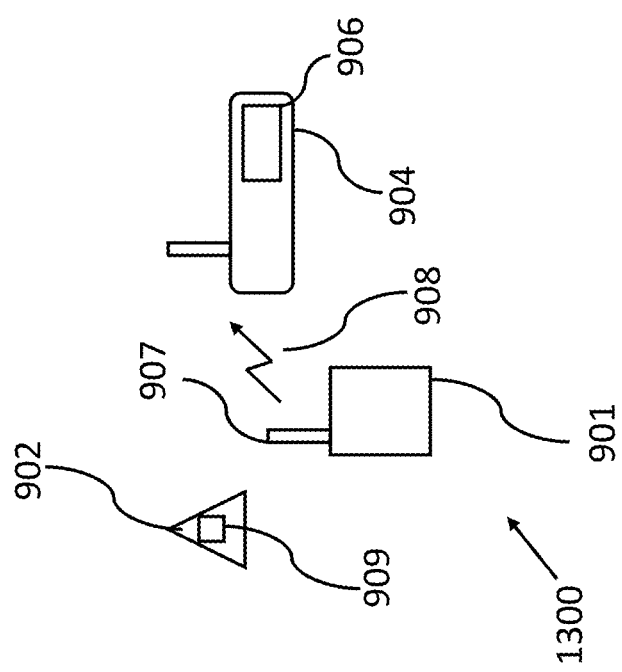
FIG. 13 is a schematic of an IoT network comprising the onboarding device in accordance with a fourteenth embodiment of the present disclosure.

FIG. 13 is a schematic of an IoT network 1300 comprising the onboarding device in accordance with an fourteenth embodiment of the present disclosure. In the present embodiment the gateway 904 comprises the registration server 906. Common reference numerals and variables between figures represents common features.

Figure 14A:
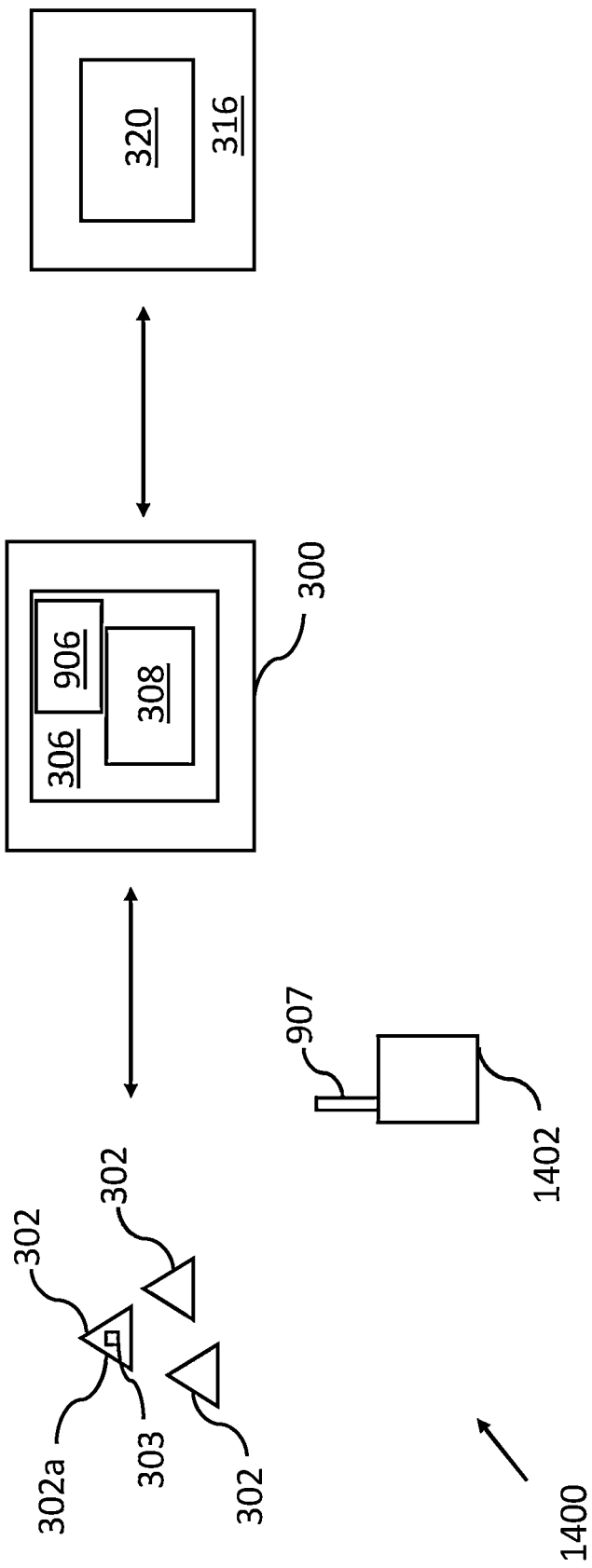
FIG. 14(a) is a schematic of an IoT network comprising an onboarding device in accordance with a fifteenth embodiment of the present disclosure.

FIG. 14(a) is a schematic of an IoT network 1400 comprising an onboarding device 1402 in accordance with a fifteenth embodiment of the present disclosure. The onboarding device 1402 may correspond to any of the onboarding devices as described herein, as will be appreciated by the skilled person. Common reference numerals and variables between Figures represents common features.

In the present embodiment, the gateway 300 may function as described for any of the embodiments of the gateway 300 as described herein, including the specific embodiment of the gateway 300 (labelled as the gateway 600) as shown in FIG. 6.

The gateway 300 is configured to communicate with the, or each, end device 302 and a remote server 316. The gateway 300 comprises a first server 306 comprising a first management layer 308. The first server 306 is configured to communicate with at least one of the end devices (for example, the end device 302a), communicate with the remote server 316 comprising the second management layer 320, and be selectively operable in either a first state in which the first management layer 308 controls the first server 306, or a second state in which the second management layer 320 controls the first server 306. In the present example, the first server 306 comprises the registration server 906.

If the gateway 300 is separated from the remote server 316 by a satellite link, as is illustrated in FIG. 3(b), then the inclusion of the registration server 906 as part of the first server 306 on the gateway 300 means that the onboarding device 1402 can be used to onboard end devices 302 even when connection between the gateway 300 and the remote server 316 is not available or is intermittent.

Figure 14B:
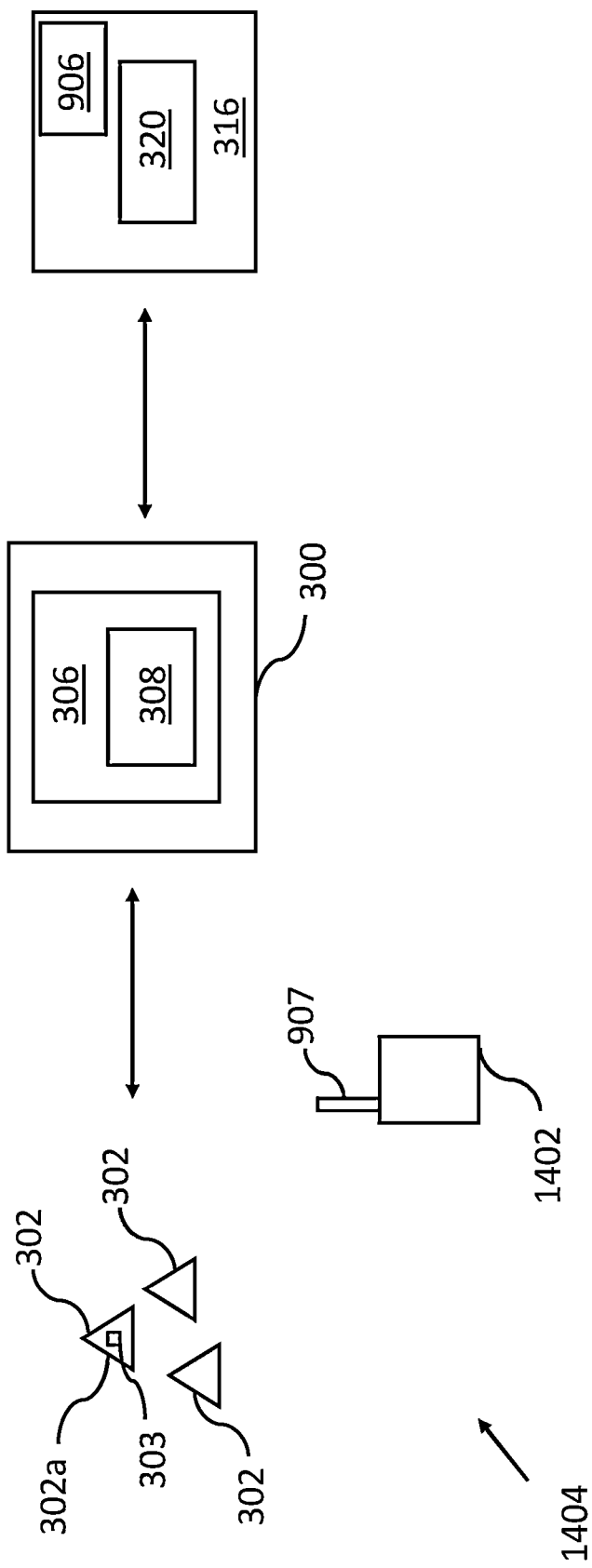
FIG. 14(b) is a schematic of an IoT network in accordance with a sixteenth of the present disclosure.

FIG. 14(b) is a schematic of an IoT network 1404 in accordance with a thirteenth sixteenth of the present disclosure. Common reference numerals and variables between Figures represents common features. The IoT network 1404 corresponds to the IoT network 1400 as shown in FIG. 14(a), however in the present example, the remote server 316 comprises the registration server 906, rather than the first server 306 as is the case in the previous embodiment.

It will be appreciated that in a further embodiment, each of the first server 306 and the remote server 316 may comprise a component that functions as the registration server 906, such that registration and removal of end devices 302 is possible with a connection to either of the first server 306 or the remote server 316.

As the onboarding devices described herein allow onboarding via the gateway 904 and uses a long range communication protocol, the end device 902 onboarding may be carried out at the point at which an end device 902 is to be deployed for operation rather than the requirement to be in close proximity to the gateway 904 as is the case in the prior art systems.

The location of the end device 902 deployment is dependent on the intention of the end device 902. For example, an end device 902 comprising a sensor that measures the level of a body of water needs to be located at that body of water. The location of the end device 902 deployment is also dependent on the distance of the end device 902 to the gateway 904 to which it needs to connect. LoRaWAN has a maximum range of approximately 15 km between the gateway 904 and the end device 902.

By using the onboarding devices presented herein, the range of the onboarding device to the gateway 904 may be the same as the range of the end device 902 to the gateway 904, assuming that they are both using the same, or similar, long range communication protocol, such as LoRaWAN— this means that the onboarding can be carried out exactly where the end device 902 is to be deployed.

By using the onboarding devices described herein, there is no requirement for onboarding to be carried out in an office that is distant from the intended deployment location.

Onboarding may be carried out at the deployment location itself even if there is poor, or no, internet (including mobile internet) infrastructure at the deployment location. This means that deployment may be simplified in remote locations where internet infrastructure is poor.

The present disclosure provides an onboarding process that is simpler than the prior art process, in that it does not require specialised knowledge of a web platform. Furthermore, there is no requirement for a user to have authorised access to the network server while being at a computer with internet access to follow a specific, multi-step onboarding process requiring key exchange. As a result, end users can onboard devices themselves, thus providing companies with the ability to deploy their own IoT solutions without having to hire new staff with suitable skills or train existing staff.

The onboarding devices of the present disclosure allow the onboarding process to be scalable in the same way that the fundamentals of LPWAN networks allow for large scale IoT networks to be deployed all over the world. Rather than bottlenecking authentication by needing to provide web server access to those that can onboard an end device, the onboarding devices of the present disclosure allows onboarding to be done by the same resources that are required for the initial deployment.

Having the option to onboard at the end device deployment location is better suited to the practicalities of the registering of end devices, and the setting up of an IoT network.

Various improvements and modifications may be made to the above without departing from the scope of the disclosure.

The invention claimed is:

1. A gateway for communicating with end devices and a remote server, comprising:
   a first server comprising a first management layer, the first server being configured to:
      i) communicate with a first end device;
      ii) communicate with the remote server comprising a second management layer; and:
      iii) be selectively operable in either:
         a first state wherein the first management layer controls the first server to enable one or more of the following at the gateway:
            allowing a user to add and/or remove other gateways;
            allowing the user to add and/or remove end devices for connection to the gateway, or another gateway; and
            to provide storage for data received at the gateway; or:
         a second state wherein the second management layer controls the first server to enable one or more of the following remote from the gateway:
            allowing the user to add and/or remove other gateways;
            allowing the user to add and/or remove end devices for connection to the gateway, or another gateway; and
            to provide storage for data received at the gateway;
   wherein:
   the first end device and the first server communicate using one of:
      i) a low power wide area network (LPWAN) communication protocol;
      ii) a wired connection; and:
      iii) 4G, 5G or further generations of mobile network technology; wherein:
   the first server is configured to spoof the LPWAN backend.

2. The gateway of claim 1, wherein the first end device is a first IoT device.

3. The gateway of claim 1, wherein a communication link between the first server and the remote server is intermittent.

4. The gateway of any claim 1, wherein the first server is configured to communicate with the remote server via one or more satellites.

5. The gateway of claim 4, wherein the, or each, satellite is a geostationary satellite or a low Earth orbit satellite.

6. The gateway of claim 1, wherein:
   the first server is configured to transmit data received from the first end device to the remote server; and/or
   the first server is configured to receive data transmitted from the remote server.

7. The gateway device of claim 1, wherein the LPWAN communication protocol is LoRaWAN.

8. The gateway of claim 1, wherein the gateway is configured to enter into a power conservation state for at least a portion of a time period.

9. The gateway of claim 8, wherein the gateway is configured to enter the power conservation state for at least a portion of the time period when the first end device and/or the remote server are not communicating with the gateway.

10. The gateway of claim 8, wherein the power conservation state comprises turning off one or more sub-components of the gateway or having one or more sub-components of the gateway enter a low power state.

11. The gateway of claim 1, wherein the first server is configured to buffer data prior to communication to the remote server.

12. The gateway of claim 11, wherein the buffered data is at least one of:
    data received from the first end device; and
    management data generated by the gateway.

13. The gateway of claim 11, wherein the buffered data is ranked based on importance.

14. The gateway of claim 1, wherein the first server comprises a memory element configured to store data.

15. The gateway of claim 1, comprising an edge computing device configured to decrypt and/or analyse data received from the first end device prior to transmission to the remote server.

16. The gateway of claim 1, wherein the first server is configured to communicate with one or more additional end devices.

17. A communication network comprising a gateway for communicating with end devices and a remote server, the gateway comprising:
    a first server comprising a first management layer, the first server being configured to:
       i) communicate with a first end device;
       ii) communicate with the remote server comprising a second management layer; and:
       iii) be selectively operable in either:
          a first state wherein the first management layer controls the first server to enable one or more of the following at the gateway:
             allowing a user to add and/or remove other gateways;
             allowing the user to add and/or remove end devices for connection to the gateway, or another gateway; and
             to provide storage for data received at the gateway; or:
          a second state wherein the second management layer controls the first server to enable one or more of the following remote from the gateway:
             allowing the user to add and/or remove other gateways;

allowing the user to add and/or remove end devices for connection to the gateway, or another gateway; and to provide storage for data received at the gateway; wherein:

the first end device and the first server communicate using one of:
i) a low power wide area network (LPWAN) communication protocol;
ii) a wired connection; and:
iii) 4G, 5G or further generations of mobile network technology; wherein:

the first server is configured to spoof the LPWAN back-end.

18. A method of communicating with a first end device and a remote server using a gateway comprising a first server comprising a first management layer, the method comprising:
i) communicating with the first end device using the first server;
ii) communicating with the remote server comprising a second management layer using the first server; and:
iii) selectively operating in either:
a first state wherein the first management layer controls the first server to enable one or more of the following at the gateway:
allowing a user to add and/or remove other gateways;
allowing the user to add and/or remove end devices for connection to the gateway, or another gateway; and
to provide storage for data received at the gateway;
or:
a second state wherein the second management layer controls the first server to enable one or more of the following remote from the gateway:
allowing the user to add and/or remove other gateways;
allowing the user to add and/or remove end devices for connection to the gateway, or another gateway; and
to provide storage for data received at the gateway; wherein:

the first end device and the first server communicate using one of:
i) a low power wide area network (LPWAN) communication protocol;
ii) a wired connection; and:
iii) 4G, 5G or further generations of mobile network technology; wherein:

the first server is configured to spoof the LPWAN back-end.

* * * * *